(12) United States Patent
Leiss et al.

(10) Patent No.: US 12,252,323 B2
(45) Date of Patent: *Mar. 18, 2025

(54) VEHICLE ENERGY STORAGE COMPARTMENT FOR IMPROVED CRASHWORTHINESS

(71) Applicant: Robson Forensic, Inc., Lancaster, PA (US)

(72) Inventors: Peter J. Leiss, Middletown, PA (US); Marcus A. Mazza, Lancaster, PA (US); Bret W. Johnson, Lancaster, PA (US); Daniel Fridline, Brooklyn, NY (US)

(73) Assignee: Robson Forensic, Inc., Lancaster, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/177,810

(22) Filed: Mar. 3, 2023

(65) Prior Publication Data

US 2023/0202733 A1 Jun. 29, 2023

Related U.S. Application Data

(63) Continuation of application No. 17/569,785, filed on Jan. 6, 2022, now Pat. No. 11,597,577, which is a
(Continued)

(51) Int. Cl.
*B65D 81/05* (2006.01)
*B60K 15/03* (2006.01)
(Continued)

(52) U.S. Cl.
CPC .............. *B65D 81/05* (2013.01); *B60K 15/03* (2013.01); *B60K 15/03006* (2013.01);
(Continued)

(58) Field of Classification Search
CPC ...... B65D 81/027; B65D 81/127; B65D 7/22; B65D 81/05; B65D 81/053; B65D 81/107;
(Continued)

(56) References Cited

U.S. PATENT DOCUMENTS

| 1,148,842 A | 8/1915 | Russell |
| 1,760,457 A | 5/1930 | Walker |

(Continued)

FOREIGN PATENT DOCUMENTS

| CA | 2553752 A1 | 7/2005 |
| DE | 3722034 C1 | 9/1988 |

(Continued)

*Primary Examiner* — Nathan J Jenness
*Assistant Examiner* — Jennifer Castriotta
(74) *Attorney, Agent, or Firm* — Potomac Law Group, PLLC

(57) ABSTRACT

A compartment for storing an energy source in a vehicle having a protective outer structure and an inner structure. The protective outer structure is maintained in position relative to the vehicle during normal operation of the vehicle. The inner structure, which holds the energy source, is positioned in the outer structure. The inner structure is maintained in position relative to the outer structure and relative to the vehicle during normal operation of the vehicle. During an impact to the vehicle, the inner structure is configured to move independent of the outer structure.

8 Claims, 13 Drawing Sheets

Related U.S. Application Data continuation of application No. 16/504,465, filed on Jul. 8, 2019, now Pat. No. 11,247,828, which is a continuation-in-part of application No. 15/994,369, filed on May 31, 2018, now Pat. No. 10,343,833, which is a continuation of application No. 15/592,346, filed on May 11, 2017, now Pat. No. 10,000,328.

(51) Int. Cl.
| | | |
|---|---|---|
| *B60K 15/067* | (2006.01) | |
| *B60K 15/073* | (2006.01) | |
| *B65D 6/10* | (2006.01) | |
| *B65D 81/02* | (2006.01) | |
| *B65D 81/107* | (2006.01) | |
| *B65D 81/127* | (2006.01) | |

(52) U.S. Cl.
CPC .............. *B60K 15/073* (2013.01); *B65D 7/22* (2013.01); *B65D 81/027* (2013.01); *B65D 81/127* (2013.01); *B60K 2015/03059* (2013.01); *B60K 15/03177* (2013.01); *B60K 2015/03375* (2013.01); *B60K 2015/03381* (2013.01); *B60K 2015/03493* (2013.01); *B60K 15/067* (2013.01); *B60K 2015/0675* (2013.01); *B60Y 2200/14* (2013.01); *B60Y 2200/145* (2013.01); *B60Y 2306/01* (2013.01); *B65D 81/107* (2013.01)

(58) Field of Classification Search
CPC .............. B65D 81/1075; B60K 15/067; B60K 15/063; B60K 2015/0675; B60K 2015/03059; B60K 15/03; B60K 15/03006; B60K 2015/03065; B60K 2015/03164; B60K 2015/03171; B60K 2015/03184; B60K 2015/03328; B60K 2015/03375; B60K 2015/03388; B60K 2015/03453; B60K 2015/0346; B60K 2015/03467; B60K 15/07; B60K 15/073
USPC ................................ 220/562, 4.14, 581, 586
See application file for complete search history.

(56) References Cited

U.S. PATENT DOCUMENTS

| | | | |
|---|---|---|---|
| 1,779,397 A | 10/1930 | Kraft | |
| 2,276,963 A | 3/1942 | Griffin | |
| 2,465,173 A | 3/1949 | Scales et al. | |
| 2,622,887 A | 12/1952 | Prior | |
| 3,158,383 A | 11/1964 | Anderson et al. | |
| 3,227,410 A | 1/1966 | Mccuen | |
| 3,511,515 A | 5/1970 | Cline et al. | |
| 3,552,596 A | 1/1971 | Landon | |
| 3,969,563 A | 7/1976 | Hollis, Sr. | |
| 4,371,181 A | 2/1983 | Monigold et al. | |
| 4,444,373 A | 4/1984 | Hayashi | |
| 4,506,756 A | 3/1985 | Bergous | |
| 4,610,453 A | 9/1986 | Collier | |
| 4,621,822 A | 11/1986 | Knoechelmann et al. | |
| 4,723,810 A | 2/1988 | Kanemaru et al. | |
| 4,919,226 A | 4/1990 | Rana et al. | |
| 4,964,531 A * | 10/1990 | Caniglia | B60K 15/077 220/88.1 |
| 5,380,042 A | 1/1995 | Hively et al. | |
| 5,443,578 A | 8/1995 | Davis, Jr. | |
| 5,496,069 A | 3/1996 | Milligan | |
| 5,547,224 A | 8/1996 | Kami et al. | |
| 5,556,133 A | 9/1996 | Oku et al. | |
| 5,673,939 A | 10/1997 | Bees et al. | |
| 5,673,940 A | 10/1997 | Gaisford et al. | |
| 5,762,145 A | 6/1998 | Bennett | |
| 6,059,252 A | 5/2000 | Emmann et al. | |
| 6,099,042 A | 8/2000 | Cook et al. | |
| 6,109,290 A | 8/2000 | Sabatinelli | |
| 6,692,028 B2 | 2/2004 | Koster et al. | |
| 6,905,164 B2 | 6/2005 | Marrs et al. | |
| 7,264,277 B2 | 9/2007 | Ono et al. | |
| 7,631,901 B2 | 12/2009 | Diehl | |
| 7,641,254 B2 | 1/2010 | Stegawski et al. | |
| 7,819,431 B2 | 10/2010 | Minami | |
| 7,913,788 B1 | 3/2011 | Bryer et al. | |
| 8,276,698 B2 | 10/2012 | Guss et al. | |
| 8,579,331 B2 | 11/2013 | Hayashi et al. | |
| 9,216,647 B2 | 12/2015 | Shipp | |
| 9,321,346 B2 | 4/2016 | Shipp | |
| 10,076,956 B2 * | 9/2018 | Ohashi | B60K 15/07 |
| 2005/0046169 A1 | 3/2005 | Pfohl et al. | |
| 2006/0032532 A1 | 2/2006 | Suess et al. | |
| 2006/0061081 A1 | 3/2006 | Kresse et al. | |
| 2006/0214416 A1 | 9/2006 | Watanabe et al. | |
| 2008/0017430 A1 | 1/2008 | Marsala et al. | |
| 2010/0213741 A1 | 8/2010 | Suzuki et al. | |
| 2010/0276165 A1 | 11/2010 | Hobson et al. | |
| 2013/0043702 A1 | 2/2013 | Hettinger et al. | |
| 2013/0264347 A1 | 10/2013 | Fujita | |
| 2016/0039281 A1 | 2/2016 | Shipp et al. | |
| 2016/0068065 A1 | 3/2016 | Shipp et al. | |

FOREIGN PATENT DOCUMENTS

| | | |
|---|---|---|
| DE | 4018197 A1 | 12/1991 |
| DE | 19820338 A1 | 11/1999 |
| DE | 102009039469 A1 | 3/2011 |
| DE | 102011100395 A1 | 1/2012 |
| DE | 202012103321 U | 9/2012 |
| DE | 102011117331 A1 | 5/2013 |
| DE | 102012023154 A1 | 8/2013 |
| EP | 0066963 A2 | 12/1982 |
| EP | 0067576 A1 | 12/1982 |
| EP | 1510393 A1 | 3/2005 |
| EP | 1564058 A1 | 8/2005 |
| FR | 1476592 A | 4/1967 |
| FR | 2785576 A1 | 5/2000 |
| FR | 2957888 A1 | 9/2011 |
| GB | 2120987 A | 12/1983 |
| JP | 2005225414 A | 8/2005 |
| JP | 2006273147 A | 10/2006 |
| JP | 2008092451 A | 4/2008 |
| WO | 2011030400 A1 | 3/2011 |
| WO | 2011052661 A1 | 5/2011 |

\* cited by examiner

VEHICLE ENERGY STORAGE COMPARTMENT FOR IMPROVED CRASHWORTHINESS

CROSS REFERENCE TO RELATED APPLICATIONS

This application claims priority and the benefit of U.S. patent application Ser. No. 17/569,785 filed Jan. 6, 2022 entitled Vehicle Fuel Tank for Improved Crashworthiness, which claims priority and the benefit of U.S. Pat. No. 11,247,828 filed Jul. 8, 2019 entitled Vehicle Fuel Tank for Improved Crashworthiness, which claims priority and the benefit of U.S. Pat. No. 10,343,833 filed May 13, 2018 entitled Vehicle Fuel Tank for Improved Crashworthiness, which claims priority and benefit of U.S. Pat. No. 10,000,328 filed May 11, 2017 entitled Vehicle Fuel Tank for Improved Crashworthiness, all of which are incorporated by reference herein in their entirety.

FIELD OF THE INVENTION

The present invention is directed to a compartment for storing fuel or an energy source in motor vehicles, including, but not limited to, cars, busses and heavy duty trucks. More particularly, the invention is directed to a compartment for storing fuel an energy source in which, during an impact to the vehicle, an inner structure moves independent of a protective outer structure and the vehicle allowing a portion of the energy or the forces associated with the impact to be absorbed by the outer structure, reducing the energy or force transferred to the inner structure.

BACKGROUND OF THE INVENTION

It is generally known that in configuring a motor vehicle with a fuel tank or an energy source, it is important to prevent the fuel tank or an energy source from damage and spillage during the crash. There are several strategies that have been employed in automotive design to meet those desires and requirements.

Those strategies include, but are not limited to, placing the fuel or energy source container, compartment or tank away from the perimeter of the vehicle, ensuring crush space is provided to absorb crash energy before the compartment is affected, constructing the container, compartment or tank of materials that are not easily cut or torn, applying shields in areas of the container, compartment or tank that may be vulnerable, routing all supply lines in protected areas and providing the filler with a check valve to prevent leakage. In addition, many container, compartment or tank are positioned in large cages or structures which are designed to absorb the impact of a crash or event. Other than attempting to absorb the impact, known systems do not use the energy of the impact to move the container, compartment or tank axially and/or radially to a position in which the fuel tank is moved further from the point of impact, out of the path of the impact or protected by the chassis of the vehicle.

Automobiles and light trucks must pass standards for fuel tank leakage in all mandated crash tests that range from frontal impacts to side impacts to rear impacts. However, these standards do not require that the fuel tanks be movable away from the frame of the vehicle during a collision or other such event. In addition, heavy trucks other than school buses have no federal requirements for crash testing to show a minimum level of crashworthiness of the fuel system.

Currently, most manufacturers of heavy trucks mount thin wall aluminum or steel tanks to the outside of the frame rails for carrying fuel. Due to the location and construction of the fuel tanks in heavy trucks, the tank is exposed to crushing during various crash events, resulting in an increased possibility of fuel spillage, fire and explosion. These risks are a known hazard in fuel storage areas of vehicles and are considered significant if there is an accident causing an object, such as, but not limited to, debris from an accident, guide rail or other vehicle components, to penetrate the fuel tank.

Rupturing of fuel tanks is believed to be a common reason for fires or explosions. Conventional fuel tanks sometimes rupture with resulting fires and explosions from the atomization of the fuel from their fuel tanks. Some of these ruptures are caused by punctures of the tank from direct contact with sharp objects during or after the collision. Even if no puncture occurs, the impacts to fuel tanks and impact forces transmitted to the fuel tanks from accidents may cause failure of the seams or parent material of conventional fuel tanks resulting in a rupture and a fuel leak.

It would be desirable to provide a container, compartment or tank for storing fuel or energy source in a vehicle which overcomes the problems stated above. It would also be desirable to provide a container, compartment or tank for storing fuel or energy source which manages the energy generated by an impact to the vehicle, thereby improving crashworthiness and reducing the occurrence of container, compartment or tank failure, fuel spillage, fire and/or explosion.

SUMMARY OF THE INVENTION

An object is to provide a fuel tank which improves crashworthiness and reduces the occurrence of container or tank failure.

An object is to provide a container or tank which reduces or prevents spillage, fire and/or explosion.

An embodiment is directed to a compartment for storing an energy source in a vehicle. The compartment includes a first structure and a second structure. The first structure is maintained in position relative to the vehicle during normal operation of the vehicle. The second structure, which holds energy source, is positioned proximate the first structure. The second structure is maintained in position relative to the first structure and relative to the vehicle during normal operation of the vehicle. During an impact to the vehicle, the second structure is configured to move independent of the first structure i) in a direction which is horizontal or lateral to the direction of a longitudinal axis of the vehicle, ii) in a direction which is vertical or perpendicular to the direction of the longitudinal axis of the vehicle, iii) in a direction which is in line with the longitudinal axis of the vehicle, iv) rotationally about a horizontal axis, v) rotationally about a first vertical axis, vi) rotationally about a second vertical axis, or vii) in a direction which is a combination of any or all of i), ii, iii), iv), v) and/or vi).

An embodiment is directed to a container for storing an energy source for use in a vehicle. The container includes a protective outer structure and an inner structure. The protective outer structure is maintained in position relative to the vehicle during normal operation of the vehicle. The inner structure holds the energy source and is positioned in the outer structure. The inner structure is maintained in position relative to the outer structure and relative to the vehicle during normal operation of the vehicle. During an impact to the vehicle, the inner structure moves independent of the outer structure and the vehicle, allowing the inner structure to be moved axially and/or radially relative to the outer structure and the vehicle to a position in which the inner structure is moved further from the point of impact, out of the path of the impact or protected by a chassis of the vehicle and/or the outer structure. During the impact to the vehicle, the movement of the inner structure independent of the outer structure and the vehicle allows a portion of the energy or the forces associated with the impact to be absorbed by the outer structure, reducing the energy or force transferred to the inner structure.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
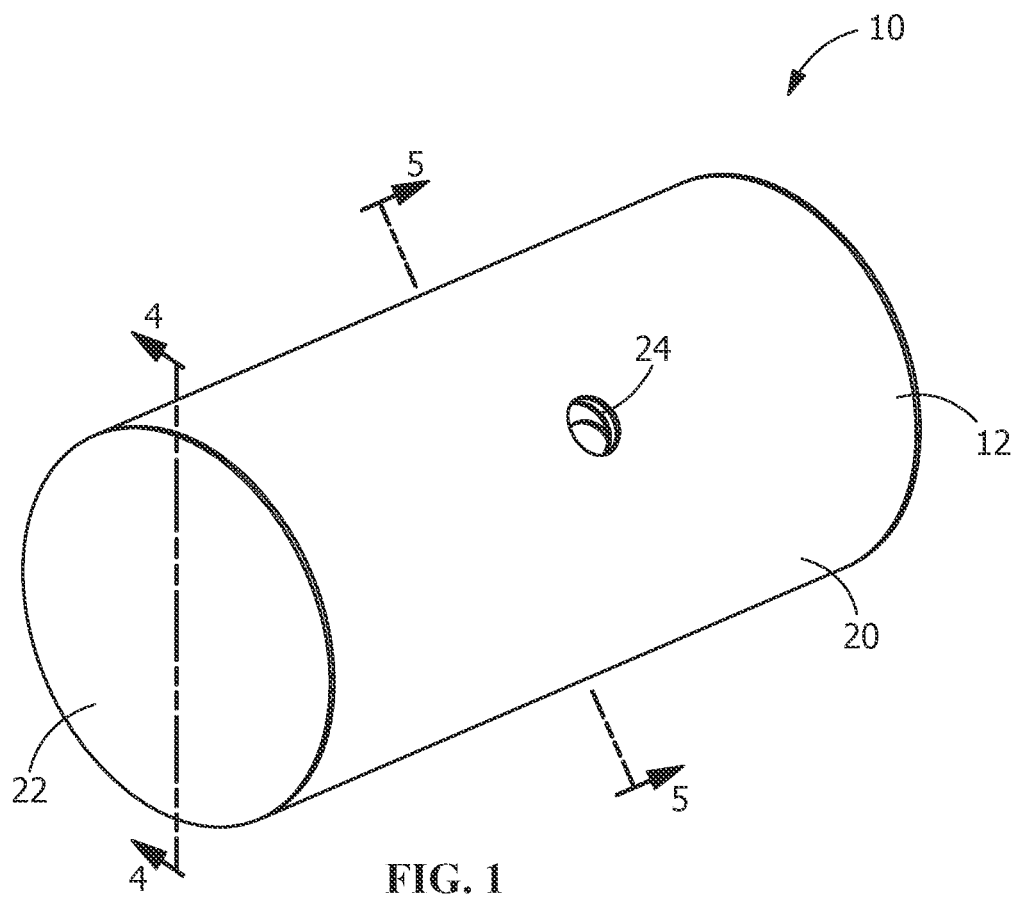
FIG. 1 is a perspective view of an illustrative container, compartment or tank according the present invention.
Figure 2:
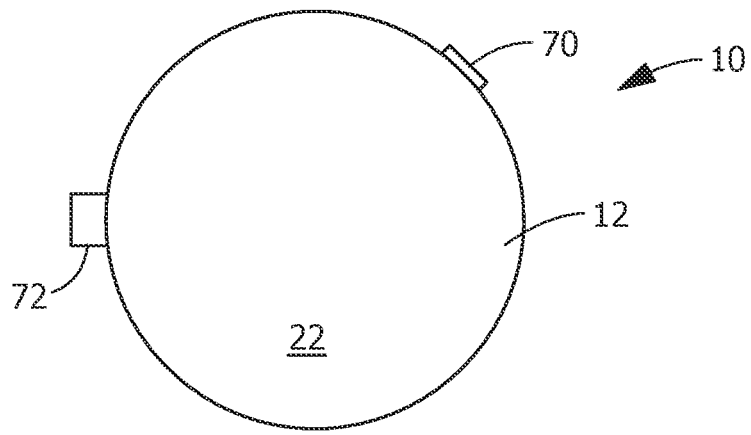
FIG. 2 is an end view of the container, compartment or tank of FIG. 1.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Referring now to the drawings wherein like reference characters refer to like and corresponding parts throughout the several views, there is shown in FIGS. 1 through 6 a compartment for storing energy source or fuel or a container for storing fuel exemplified as a fuel tank 10 for a motor vehicle 11 (FIGS. 6a and 6b), such as, but not limited to, a car, bus, tractor of a tractor trailer truck, other heavy trucks, boats, airplanes or other types of vehicles. While one fuel tank 10 is shown, other numbers of fuel tanks may be used without departing from the scope of the invention. Fuel is any component or substance which is an energy source for a motor vehicle, including, but not limited to, compressed natural gas, liquefied natural gas, liquefied petroleum gas, hydrogen, diesel, biodiesel, methane, methanol, biobutanol, dimethyl ether, ammonia, renewable hydrocarbon biofuels, batteries, and fuel cells.

Figure 3:
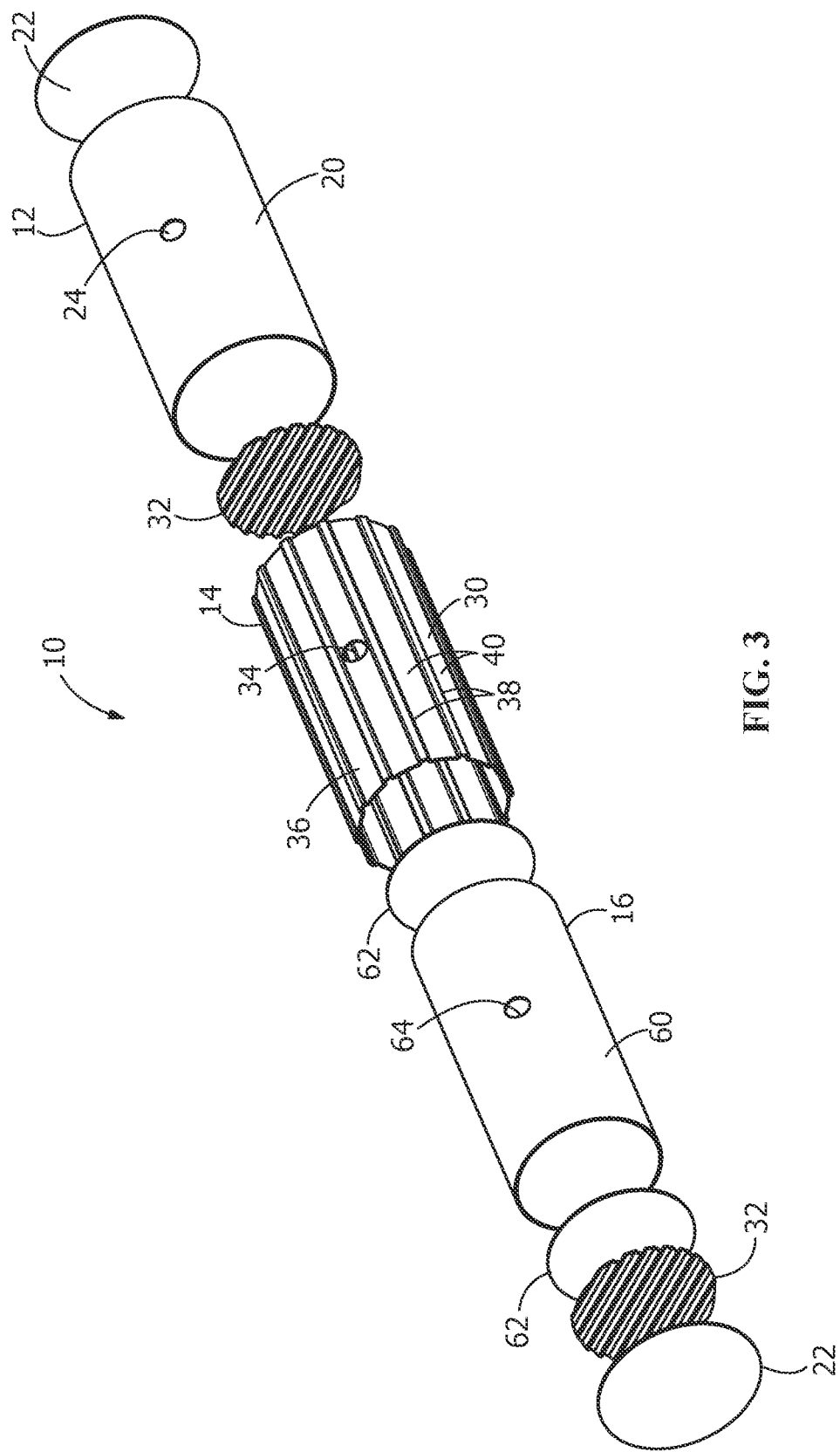
FIG. 3 is an exploded perspective view of the container, compartment or tank of FIG. 1, illustrating an outer shell, a crush sleeve and an inner shell.
Figure 4:
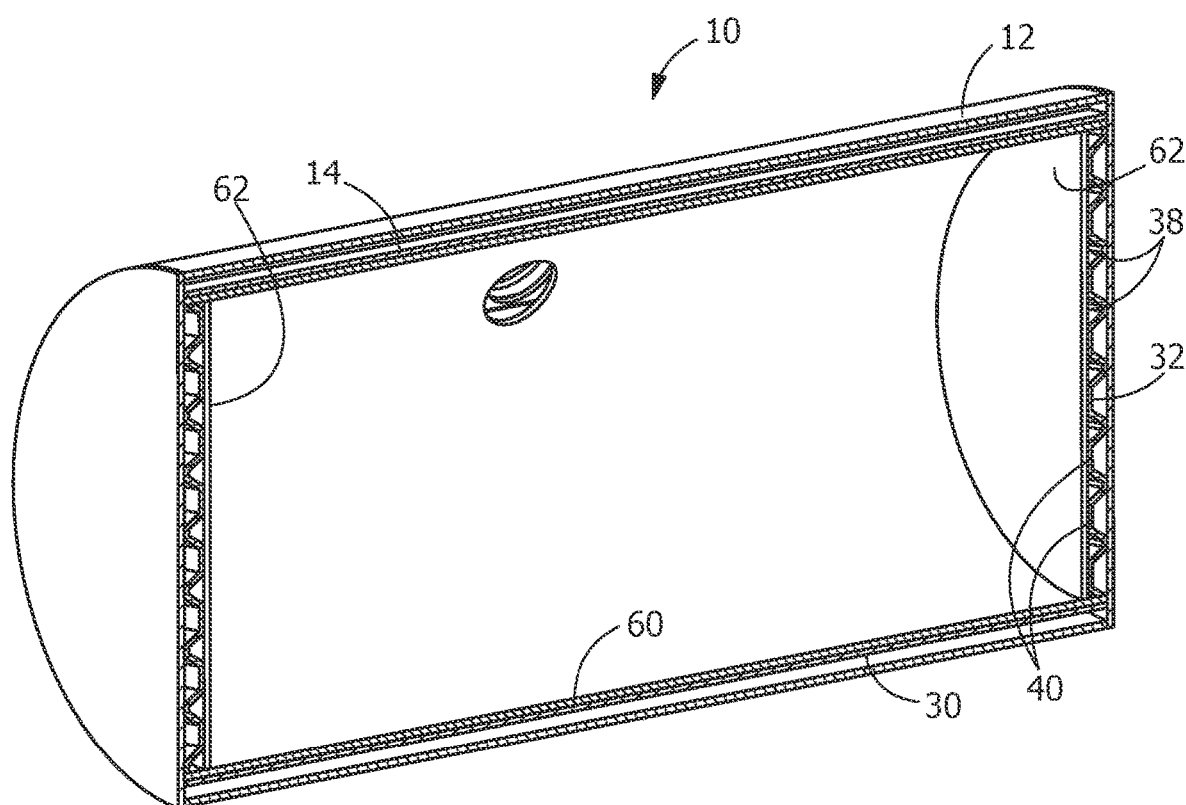
FIG. 4 is a cross-sectional view taken along line 4-4 of FIG. 1.
Figure 5:
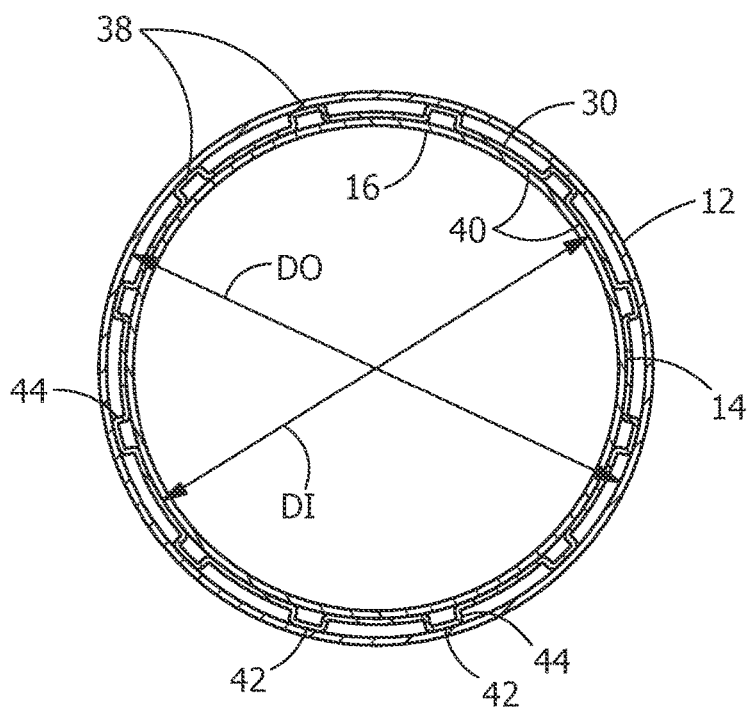
FIG. 5 is a cross-sectional view taken along line 5-5 of FIG. 1.
Figure 6A:
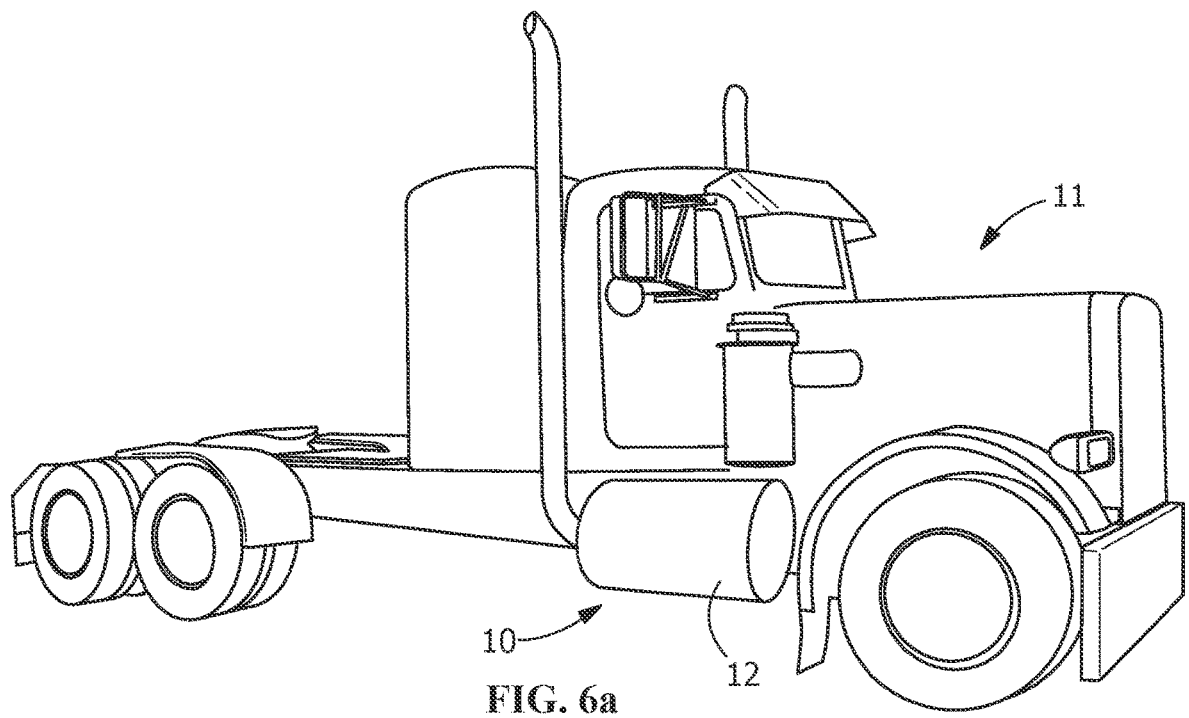
FIG. 6a is a side view of an illustrative vehicle with the container, compartment or tank of FIG. 1 mounted thereto.
Figure 6B:
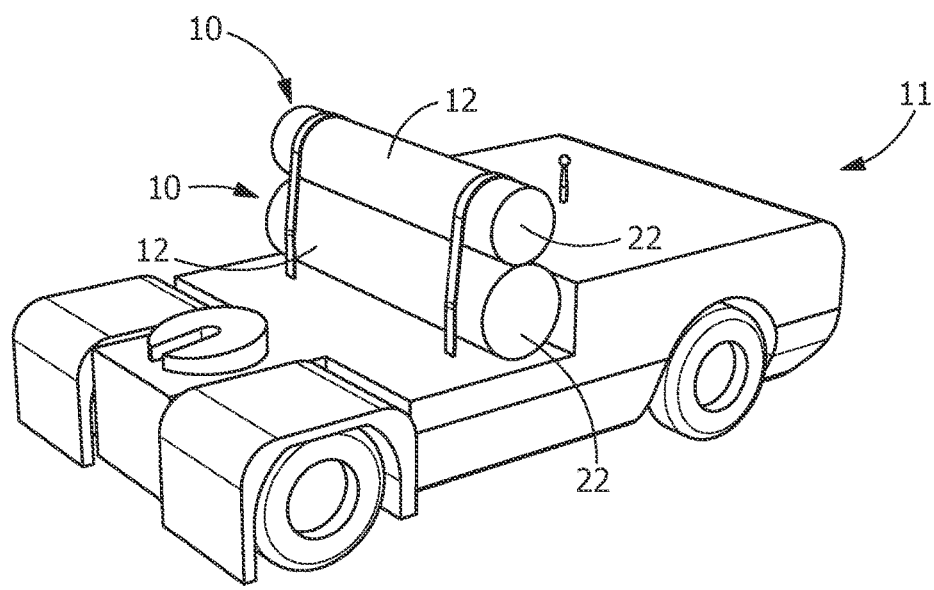
FIG. 6b is a side view of an illustrative autonomous vehicle with the container, compartment or tank of FIG. 1 mounted thereto.
Figure 7:
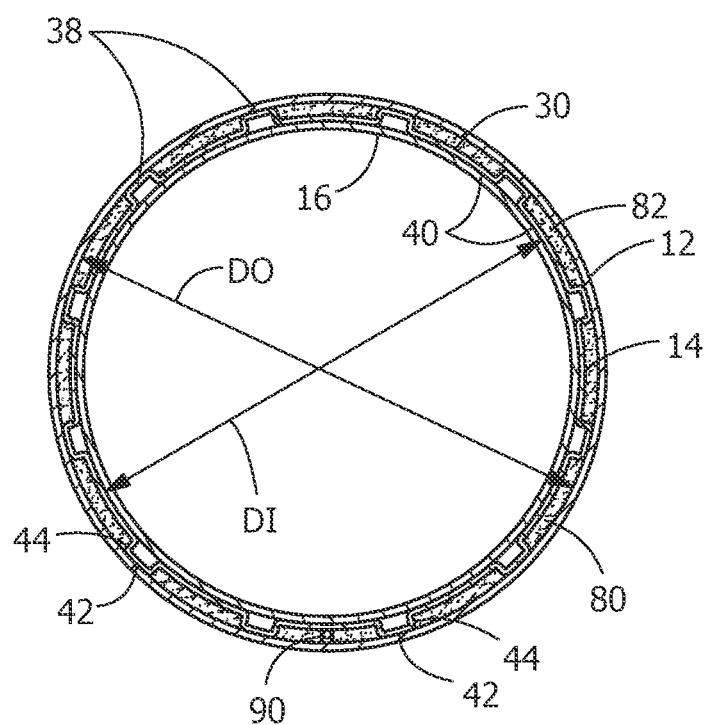
FIG. 7 is a cross-sectional view similar to that of FIG. 5, with a hazard control material provided between the inner shell and the outer shell.

As best shown in FIGS. 3 through 5, the fuel tank 10 includes a first or protective outer structure, casing, shell or tank 12, a deformable structure or crush sleeve 14 and a second or inner structure, casing, shell or tank 16 which is configured to hold the fuel or energy source. While the protective outer shell 12, the crush sleeve 14 and the inner shell 16 are shown as cylindrical members in the illustrative embodiment, other shapes and configurations may be used without departing from the scope of the invention.

The protective outer shell 12 has a cylindrical side wall 20 and end walls or caps 22. One or both end walls 22 are attached to the side wall 20 after the crush sleeve 14 and inner shell 16 have been inserted therein. In the illustrative embodiment shown, a fuel receiving opening 24 and a fuel dispensing opening (not shown) extends through the side wall 20. The side wall 20 may be made in one continuous piece with no seam or may be made by forming sheet material into a cylindrical member and joining the ends in any conventional manner, such as by a series of continuous welds. The end walls 22 are joined to the side wall 20 in any conventional manner, such as by a series of continuous welds. The side wall 20 and end walls 22 may be made from any material having the strength characteristics desired, including, but not limited to, aluminum, steel and cross-linked polyethylene. The side wall 20 and end walls 22 of the protective outer shell 12 form an outer tank.

In the illustrative embodiment shown, the crush sleeve 14 has a cylindrical side wall 30 and end caps 32. However, the crush sleeve 14 can be of various configurations without departing from the scope of the invention. For example, spokes, fins or honeycombs may be provided to properly position and maintain the inner shell 16 in the outer shell 12.

In the illustrative embodiment shown, a fuel receiving opening 34 and a fuel dispensing opening (not shown) extends through the side wall 30. The side wall 30 may be made in one continuous piece with no seam or may be made by forming sheet material into a cylindrical member and joining the ends of the sheet in any conventional manner, such as by a series of continuous welds. The side wall 30 may be made from any material having the strength characteristics desired, including, but not limited to, steel, cross-linked polyethylene and carbon fiber reinforced composite.

In the illustrative embodiment shown, the crush sleeve 14 has a corrugated surface 36 which extends essentially the entire length of the crush sleeve 14. The corrugated surface 36 include a plurality of elongate ridge structures or corrugations 38 formed in the material of the crush sleeve 14. Corrugated surface 36 advantageously change the strength and rigidity of the crush sleeve 14. The change in strength or rigidity may be increased or decreased depending upon the structure of the corrugated surface 36. Furthermore, corrugated surface 36 provides spacing between the outer shell 12 and the inner shell 16, as will be more fully described.

The plurality of corrugations 38 may be elongated ridges, or raised portions, of the crush sleeve 14. Thus, each respective elongate ridge structure or corrugation 38 defines a major longitudinal axis and extends longitudinally across the crush sleeve 14. Further, each respective elongate ridge or corrugation 38 of the plurality is spaced apart from adjacent elongate ridges of the plurality at predetermined intervals to form the corrugated surface 36. Thus, a plurality of regions 40 (e.g., valley or troughs) are defined between the respective elongate ridge corrugations 38. It should be noted that a corrugation 38 need not extend across the entire length of crush sleeve 14 and the corrugations 38 are not limited to the exemplary configuration and orientation shown.

The raised corrugations 38 may be of a generally periodic pattern, meaning that they repeat at regular predetermined intervals. In accordance with various aspects of the present disclosure, specific details and features of the corrugation design and pattern can serve to significantly enhance functionality of the crush sleeve 14 and improve performance of the crush sleeve 14 under impact or event, such as, but not limited to, a collision, crash or accident.

As best shown in FIGS. 4 and 5, each elongated ridge or corrugation 38 has a top wall 42 and a pair of two side walls 44. In some example embodiments, the side walls 44 may be oriented at an angle in relation to the top wall 42. In other examples, the side walls 44 may be perpendicular with respect to the top wall 42. The width and height of the top wall 42 and side walls 44 may vary according to the particular strength characteristics desired.

For example, the width and height of the top wall 42 and side wall 44 may be increased or reduced to change or tune the amount of energy absorbed during impact. The corrugated surface designs in accordance with certain aspects of the present teachings may reduce the propensity for local cracks or failure under concentrated impact load. In various aspects, the present disclosure contemplates superior corrugation profiles and designs by optimizing relationships between elongated ridge/corrugation width, corrugation height, material thickness, spacing between elongated ridges/corrugations, wall angles, and the like. For example, the thickness may be increased strategically at various locations on the corrugation to help provide structural support to areas subjected to especially high stress, where mechanical failure may otherwise occur.

The nonlinear configuration of the crush sleeve 14 provides additional strengthening thereby enhancing the ability of the crush sleeve 14 to provide additional integrity to the fuel tank 10 and to provide additional crush resistance for the inner shell 16. The nonlinear configuration also allows for forces applied thereto to be better dissipated over the entire surface of the crush sleeve 14, thereby preventing lateral forces from being transferred directly to the inner shell 16 during an impact. During a less severe impact, the energy distributed to the corrugations 38 of the regions 40 or the impact energy is dissipated or stored elastically, thus reducing the probability of failure during a less severe impact.

The width, the height and the periodic shape of the corrugations 38 may be determined using computer modeling such as computer-aided engineering simulations and experiments. The programs may assist with optimizing geometrical parameters for the corrugation geometry by balancing the height, widths and thickness of the support structure in consideration of the material properties. The programs may assist with optimizing the height, width at the top, wall angle, curvature of the impact surface, and an increase in thickness in localized areas to create a desired balance between the stiffness and impact performance of the corrugated region 40.

In various embodiments, the corrugations 38 may further include strategically thickened areas or thickened regions for structural support, which improve impact resistance. The thickened regions may be included in the top wall 42, side walls 44, the corners where the top wall 42 is joined to the side walls 44, or any combination thereof. Other strengthening features, such as, but not limited to, bevels may also be provided.

In various embodiments, the top wall 42 of each corrugation 38 may be arced or curved. The curvature on the top wall 42, allowing the center area to be the first region to contact the inner shell 16 in the event of an impact, thus storing energy before the corner area contact the inner shell 16, allowing the radius of curvature to deflect the impact and distribute the load across more than one point on the top wall 42. Additionally, the corners may be rounded.

The inner shell 16 has a cylindrical side wall 60 and end walls or caps 62. In the illustrative embodiment shown, a fuel receiving opening 64 and a fuel dispensing opening (not shown) extends through the side wall 60. The side wall 60 may be made in one continuous piece with no seam or may be made by forming sheet material into a cylindrical member and joining the ends in any conventional manner, such as by a series of continuous welds. The end walls 62 are joined to the side wall 60 in any conventional manner, such as by a series of continuous welds. The side wall 60 and end walls 62 may be made from any material which will not degrade or fail when exposed to the fuel or energy source which is stored in the inner shell 16, such as, but not limited to, steel, aluminum, polyethylene or neoprene.

The inner shell 16 may be made of rigid, semi-rigid or elastic material. The side wall 60 and end walls 62 of the inner shell 16 form an inner tank. The inner shell 16 has an outer diameter DI which is smaller than the inner diameter DO of the outer shell 12. The inner shell may include baffles or one or more sub compartments, which may be interconnected or isolated from each other. When fully assembled, the inner shell is maintained in position, for example, but not limited to centered, relative to the outer shell 12 and is held in place by the crush sleeve 14.

While the outer shell 12, crush sleeve 14 and inner shell 16 have a cylindrical configuration in the embodiment shown, other configuration may be used without departing from the scope of the invention.

In various embodiments, crush sleeve 14 (including end caps 32), inner shell 16 (including end caps 62) and/or outer shell 12 (including end caps 22) may have a coating or layer provided thereon to allow the crush sleeve 14 to engage or contact the inner shell 16 and/or outer shell 12 during normal use without exposing the inner shell 16 and/or outer shell 12 to excessive wear or degradation. Such coating may include, but is not limited to, polymer, metallic, ceramic or other substances. Alternatively, the crush sleeve 14 (including end caps 32), inner shell 16 (including end caps 62) and/or outer shell 12 (including end caps 22) may be bonded by welding, adhesive or other means to prevent movement and wear during normal use.

An inlet pipe or tube 70 (FIG. 2) is secured to the fuel tank 10 and extends through fuel receiving openings 24, 34, 64. The inlet tube 70 may be secured to the fuel tank 10 in any known manner. The inlet tube 70 is for the purpose of introducing the desired fuel into the respective tank 10. The inlet tube may be secured to the fuel tank 10 at various locations, including, but not limited to, near the rearward end of the tank 10. A fuel feed tube or pipe 72 extends through the fuel dispensing openings of the fuel tank 10 for the purpose of feeding the fuel to the engine of the vehicle. The feed tube or pipe 72 may be located at various locations, including, but not limited to, near the forward end of the tank 10.

In the illustrative embodiments shown, the tanks 10 are adapted to be horizontally attached to the truck or vehicle so that the plane of the longitudinal axis of the tank 10 is essentially parallel to the plane of the longitudinal axis of the truck or vehicle. It should be understood that the location and orientation of tank 10 may vary based on various factors, including, but not limited to, the space available for the tanks 10 and the desired capacity of the tank 10.

When the vehicle or truck is operating under normal conditions (no impact caused by a collision, crash or accident has occurred), the inner shell 16 is maintained in position, for example, but not limited to centered, in the outer shell 12 as previously described. However, during an impact, such as caused by a collision, crash or accident, the force of the impact may cause the inner shell 16 to move relative to the outer shell 12.

The outer shell 12 of the fuel tank 10 is mounted to the vehicle using known methods, such as, but not limited to, bolts, welding and straps. The positioning of the fuel tank on the vehicle may vary depending on the configuration of the vehicle. Such locations include, but are not limited to, on the side of the vehicle, under the vehicle or on top of the vehicle, or between the frame rails of the vehicle. In various applications, the outer shell 12 may be mounted in such a manner to allow for the partial release of the outer shell 12 when a force is applied or transmitted to the fuel tank 10 due to an impact. This allows the fuel tank 10 to be moved axially and/or radially relative to the chassis to a position in which the fuel tank is moved further from the point of impact, out of the path of the impact or protected by the chassis of the vehicle.

In operation the outer shell 12 is mounted to the vehicle as described. The inner shell 16 is not attached to the outer shell 12. Instead, in the illustrative embodiment shown, the inner shell 16 rests on the crush sleeve 14. The crush sleeve 14 is also not attached to the outer shell 12. Instead, in the illustrative embodiment shown, the crush sleeve 14 rests on the outer shell 12. The crush sleeve 14 and inner shell 16 are dimensioned such that when assembled, the inner shell 16 engages the crush sleeve 14 to prevent the movement of the inner shell 16 relative to the crush sleeve 14 during normal operation. The crush sleeve 14 and outer shell 12 are dimensioned such that when assembled, the crush sleeve 14 engages the outer shell 12 to prevent the movement of the crush sleeve 14 relative to the outer shell 12 during normal operation.

While the crush sleeve 14 and inner shell 16 are captured by outer shell 12 and prevented from movement relative to the vehicle and the outer shell 12 during normal operation, the crush sleeve 14 and inner shell 16 may move independent of the vehicle and/or the outer shell 12 during an impact or event. This allows a portion of the energy or the forces associated with an impact to be absorbed outer shell 12 and the crush sleeve 14, thereby reducing the energy or force transferred to the inner shell 16.

The inner shell 16 is movable relative to the vehicle and the outer shell 12 during the impact, thereby allowing the inner shell 16 to move inside the outer shell 12. In addition, in various embodiments, the outer shell 12 is movable relative to the vehicle during an impact. This allows the inner shell 16 of the fuel tank 10 to be moved axially and/or radially relative to the chassis of the vehicle to a position in which the inner shell 16 is moved further from the point of impact, out of the path of the impact or protected by the chassis of the vehicle and/or the outer shell 12 and the crush sleeve 14. The movement of the inner shell 16 relative to the vehicle and the outer shell 12 and the crush sleeve 14 may be, but is not limited to, i) in a direction which is horizontal or lateral to the direction of the longitudinal axis of the vehicle, ii) in a direction which is vertical or perpendicular to the direction of the longitudinal axis of the vehicle, iii) in a direction which is in line with the longitudinal axis of the vehicle, iv) rotationally about the x axis, v) rotationally about the y axis, vi) rotationally about the z axis, or vii) in a direction which is a combination of any or all of i), ii, iii), iv), v) and/or vi). This allows the inner shell 16 to have 6 degrees of freedom via the movement and distortion of the outer shell 12 and the crush sleeve 14.

As previously described, the outer shell 12 and the crush sleeve 14 absorb a percentage of the energy or forces associated with the impact or event. The outer shell 12 and crush sleeve 14 also provide additional resistance to punctures or tears, as the outer shell 12 and crush sleeve 14 are made from material having sufficient strength to resist or inhibit the puncture or tearing thereof. As the outer shell 12 and crush sleeve 14 form a continuous shield around the inner shell 16, the inner shell is protected. In addition, as the inner shell 16 is movable or displaced relative to the outer shell 12 and the crush sleeve 14 away from the point of impact during an impact, the inner shell 16 is allowed to be moved away from any object or protrusion which extends through the outer shell 12 and crush sleeve 14 at or near the point of impact, thereby preventing or inhibiting sharp objects or protrusions from contacting the inner shell 16. Instead, the protrusions engage the outer shell 12 and the crush sleeve 14. As the inner shell 16 is protected by the outer shell 12 and crush sleeve 14, the risk of failure of the inner shell 16 is reduced.

The fuel tank 10 described herein absorbs and manages the energy created by an impact or event to manipulate or move the inner shell 16 to a position in which the inner shell 16 is less prone to failure during or after the impact or event thereby improving crashworthiness and reducing the occurrence of tank failure, fuel spillage, fire and/or explosion.

In alternate illustrative embodiments, the outer shell 12, crush sleeve 14 and/or inner shell 16 may also have energy dissipating/absorbing material, such as, but not limited to, aluminum, polymer or ferrous material attached thereto. The energy dissipating/absorbing material provides additional protection to the fuel tanks, as the energy dissipating/absorbing material further isolates the forces associated with the impact or event from reaching or damaging the inner shell 16.

In alternate illustrative embodiments, the crush sleeve 14 may be made from non-corrugated materials. For example, the crush sleeve 14 may be made from one or more foam members which provide energy absorption in the event of an impact. The energy absorbing characteristics of foam members serve to dissipate energy transferred during the impact so that inner shell 16 is less likely to be damaged. To provide the energy absorbing characteristics, the foam members may be made of a closed cell foam, such as PU (Polyurethane), Epoxy-Foam and PMI (Polymethacrylimide). However, it should be appreciated that other types of materials, such as an open cell foam or other impact absorbing materials and structures (e.g. honeycomb structures), can be used to make foam members.

In alternate illustrative embodiments, the space 80 between the inner shell 16 and the outer shell 12 may also include a hazard control material 82 in addition to the crush sleeve 14. The fuel tank 10 may be configured to release the hazard control material 82 in response to a hazard condition (for example, an impact) such that the fuel or energy source is less hazardous or rendered substantially harmless. The hazard control material 82 may include a fire extinguishant or fire suppressant material. As a result of an impact, which causes the inner shell 16 to fail, the hazard control material 82 interacts with the fuel to control, suppress or extinguish any combustion associated with the release of the fuel and vapors from the inner shell 16. In this way, the probability of creating a fireball in the fuel tank is reduced and the risks associated with operation of the vehicle are decreased.

Figure 8:
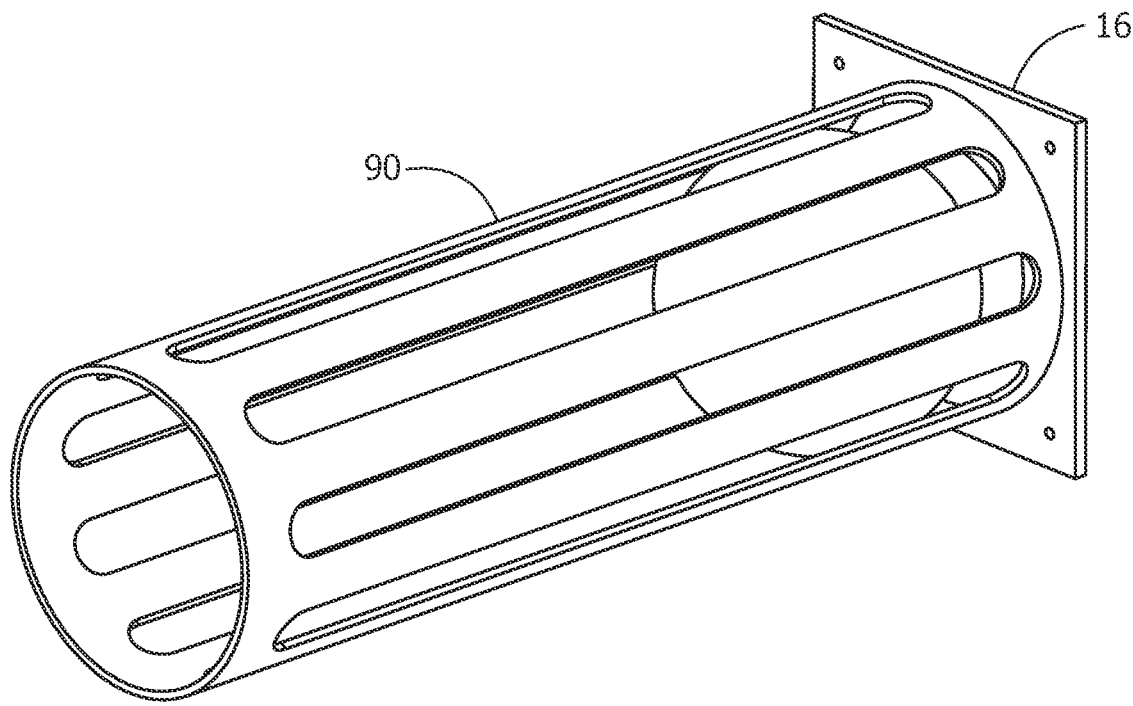
FIG. 8 is a perspective view of a check valve for use with the container, compartment or tank.
Figure 9:
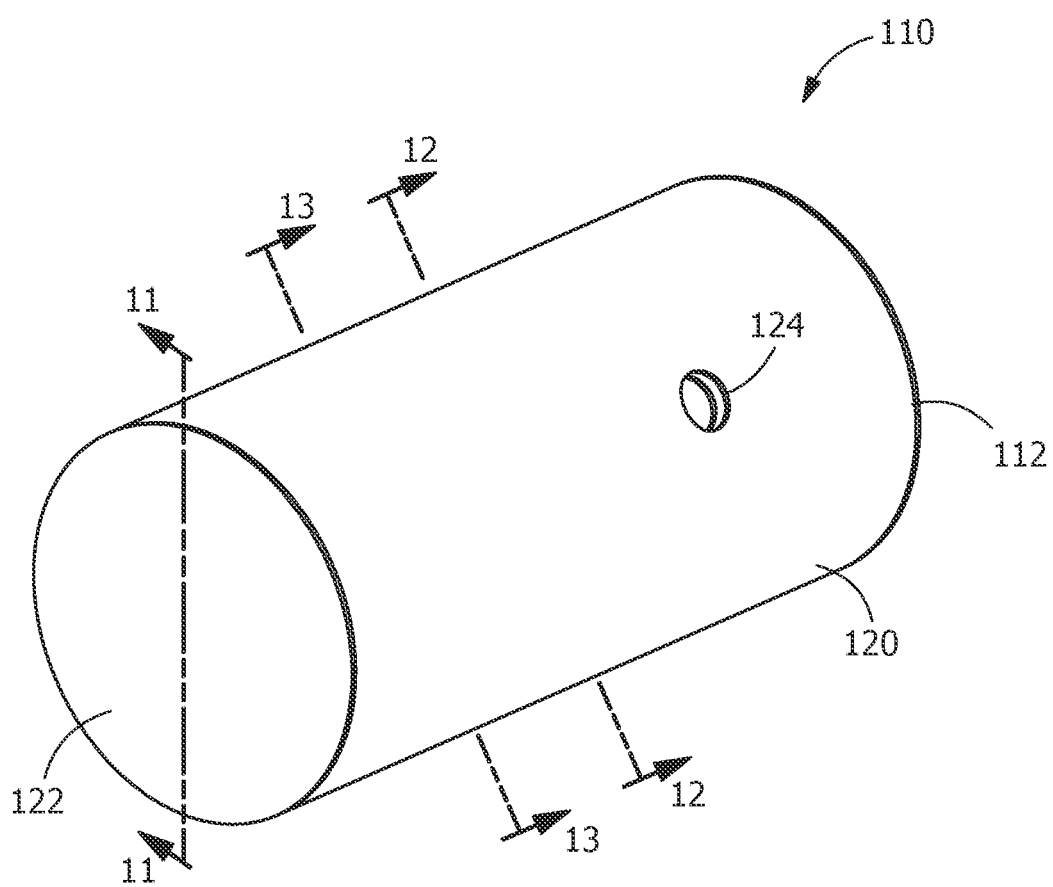
FIG. 9 is a perspective view of a second illustrative container, compartment or tank according to the present invention.

The space 80 may be configured to accommodate sufficient hazard control material 82 according to the anticipated hazard. The space 80 may include one or more separate sub compartments, or interconnected semi-separate sub compartments. In addition, the space 80 may comprise any appropriate materials to accommodate the hazard control material 82. For example, the inner shell 16, crush sleeve 14 and outer shell 12 may comprise or be lined with materials that do not react to the hazard control material 82 or provide a shield around the hazard control material 82. The inner shell 16 and/or outer shell 12 may be configured to fail or open in a specific location upon impact to facilitate the controlled release of the fuel and the hazard control material 82 into the surrounding environment, thereby minimizing or preventing the release of atomized fuel. For example, a check valve 90 (FIG. 8), such as, but not limited to, a spring loaded check valve, may be provided in the inner shell 16. The check valve 90 operates in a known manner to maintain the fuel in the inner shell 16 during normal operating conditions. In the event of an impact, the spring loaded check valve 90 is configured to open and release the fuel if a threshold pressure inside the inner shell 16 is exceeded. This facilitates the controlled release of the fuel during an impact. Consequently, the hazard control material 82 may be positioned proximate to the spring loaded check valve 90 for maximum efficiency.

The hazard control material 82 may include a substantially solid material such as granular material or a powder, as well as a substantially fluid material such as liquids, gases and vapors. The hazard control material 82 may comprise a material in various phases simultaneously. In addition, the hazard control material 82 may include multiple materials.

In use, during an impact, the inner shell 16 may rupture or fail, causing the fuel to be released from the inner shell 16, generating the hazard condition. However, the fuel contacts, mixes and reacts with the hazard control material 82, allowing the hazard control material 82 to mitigate the hazard presented by the fuel following the trigger event.

The outer shell 12 and crush sleeve 14 form a protective area, cage or support area which provides a crush zone to protect the inner shell 16 by absorbing and dissipating the energy associated with an impact. The use of the support structure provides both impact and tearing protection for the inner shell 16. The outer shell 12 and crush sleeve 14 also allows mounting of additional energy absorbing devices or structures as needed.

A series of virtual dynamic impact tests ("drop tests") were conducted on the embodiment shown in FIGS. 1 through 6 to simulate a 30 foot drop of the tank onto a rigid surface and the deformation, stress and equivalent plastic strain immediately after the impact of the tank with the ground was measured. The following Table 1 shows the maximum values of each quantity for the following conditions: 1) standard saddle tank from a semi-tractor, empty; 2) standard saddle tank from a semi-tractor, 95% full; 3) fuel tank according the description above, empty; and 4) fuel tank according the description above, 95% full.

TABLE 1

Results Summary of Load Conditions

| Load Condition | Von Mises Stress (ksi) | | | Equivalent Plastic Strain | | |
| --- | --- | --- | --- | --- | --- | --- |
| | Maximum | Allowable | F.S. | Maximum | Allowable | F.S. |
| 1 | | | | | | |
| Outer Tank | 33.5 | 45 | 1.34 | 0.049 | 0.17 | 3.47 |
| 2 | | | | | | |
| Outer Tank | 33.6 | 45 | 1.34 | 0.134 | 0.17 | 1.27 |

TABLE 1-continued

Results Summary of Load Conditions

| Load Condition | Von Mises Stress (ksi) | | | Equivalent Plastic Strain | | |
|---|---|---|---|---|---|---|
| | Maximum | Allowable | F.S. | Maximum | Allowable | F.S. |
| 3 | | | | | | |
| Outer Tank | 34.1 | 45 | 1.32 | 0.154 | 0.17 | 1.10 |
| Inner Tank | 39.1 | 52.9 | 1.35 | 0.057 | 0.20 | 3.51 |
| 4 | | | | | | |
| Outer Tank | 31.3 | 45 | 1.44 | 0.133 | 0.17 | 1.28 |
| Inner Tank | 38.6 | 52.9 | 1.37 | 0.121 | 0.20 | 1.65 |

As is shown in the table, the factor of safety increases for stress and strain when under load conditions 3 and 4 (fuel tank as described herein) when compared with load conditions 1 and 2 (known standard saddle tank). Additionally, the factor of safety of the inner shell is greater than that of the outer shell or tank, indicating that the fuel tank as described and claimed herein is safer against breaches of the tank, as the tank has higher margins against material failure.

Referring to FIGS. 9 through 13, an alternate compartment for storing fuel or container for storing fuel exemplified as an alternate fuel tank 110 is shown for a motor vehicle 11 (FIGS. 6a and 6b), such as, but not limited to, a car, bus, tractor of a tractor trailer truck, other heavy trucks, boats, airplanes or other types of vehicles. While one fuel tank 110 is shown, other numbers of fuel tanks may be used without departing from the scope of the invention. Fuel is any component or substance which is an energy source for a motor vehicle, including, but not limited to, compressed natural gas, liquefied natural gas, liquefied petroleum gas, hydrogen, diesel, biodiesel, methane, methanol, biobutanol, dimethyl ether, ammonia, renewable hydrocarbon biofuels, batteries, and fuel cells.

Figure 10:
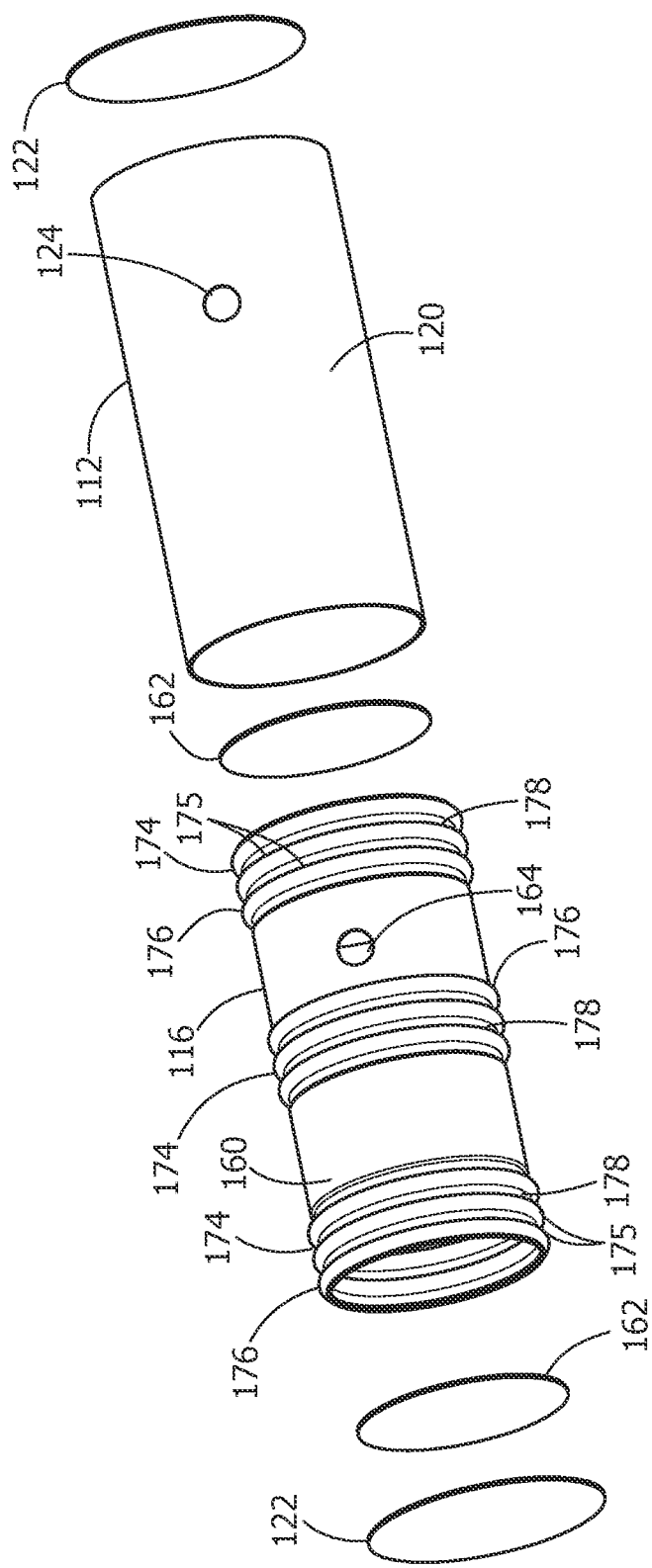
FIG. 10 is an exploded perspective view of the container, compartment or tank of FIG. 9, illustrating an outer shell and an inner shell.

As best shown in FIG. 10, the fuel tank 110 includes a first or protective outer casing, shell or tank 112 and a second or inner casing, shell or tank 116 which is configured to hold the fuel or energy source during normal operation. While the protective outer shell 112 and the inner shell 116 are shown as cylindrical members in the illustrative embodiment, other shapes and configurations may be used without departing from the scope of the invention.

The protective outer shell 112 has a cylindrical side wall 120 and end walls or caps 122. One or both end walls 122 are attached to the side wall 120 after the inner shell 116 has been inserted therein. In the illustrative embodiment shown, a fuel receiving opening 124 and a fuel dispensing opening (not shown) extend through the side wall 120. The side wall 120 may be made in one continuous piece with no seam or may be made by forming sheet material into a cylindrical member and joining the ends in any conventional manner, such as by a series of continuous welds. The end walls 122 are joined to the side wall 120 in any conventional manner, such as by a series of continuous welds. The side wall 120 and end walls 122 are rigid, inflexible and/or inelastic and may be made from any material having the strength characteristics desired, including, but not limited to, aluminum, steel and cross-linked polyethylene. The side wall 120 and end walls 122 of the protective outer shell 112 form an outer tank.

The inner shell 116 may be made of rigid, semi-rigid or elastic material. The inner shell 116 has a cylindrical side wall 160 and end walls or caps 162. In the illustrative embodiment shown, the end walls 162 have a curved, radiused or arcuate configuration wherein the center of the end walls 162 is positioned proximate to or in engagement with the end walls 122. However, the end walls 162 may have other configurations, such as, but not limited to straight and may include ribbed or bellow regions.

In the illustrative embodiment shown, a fuel receiving opening 164 and a fuel dispensing opening (not shown) extend through the side wall 160. The side wall 160 may be made in one continuous piece with no seam or may be made by forming sheet material into a cylindrical member and joining the ends in any conventional manner, such as by a series of continuous welds. The end walls 162 are joined to the side wall 160 in any conventional manner, such as by a series of continuous welds. The side wall 160 and end walls 162 are rigid, semi-rigid or elastic and may be made from any material having the strength characteristics desired and which will not degrade or fail when exposed to the fuel or energy source which is stored in the inner shell 116, such as, but not limited to, steel, aluminum, polyethylene or neoprene.

Figure 11:
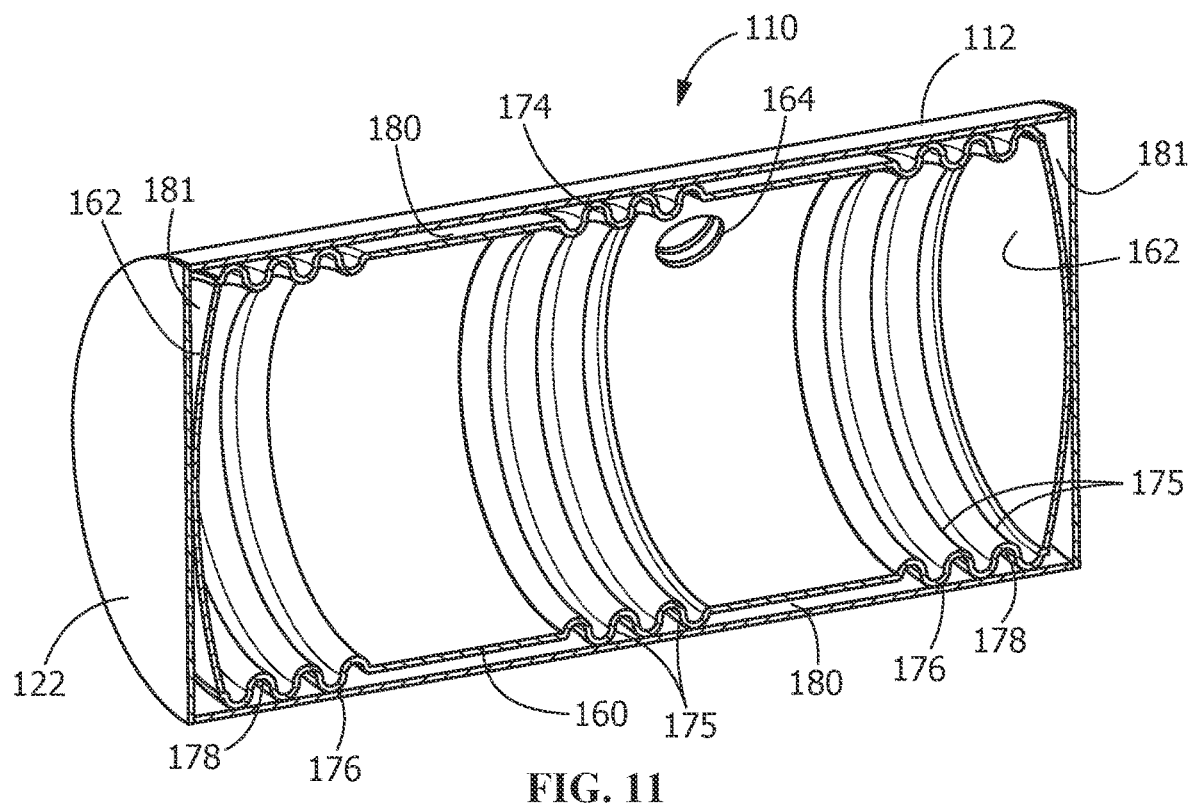
FIG. 11 is a cross-sectional view taken along line 11-11 of FIG. 9.
Figure 12:
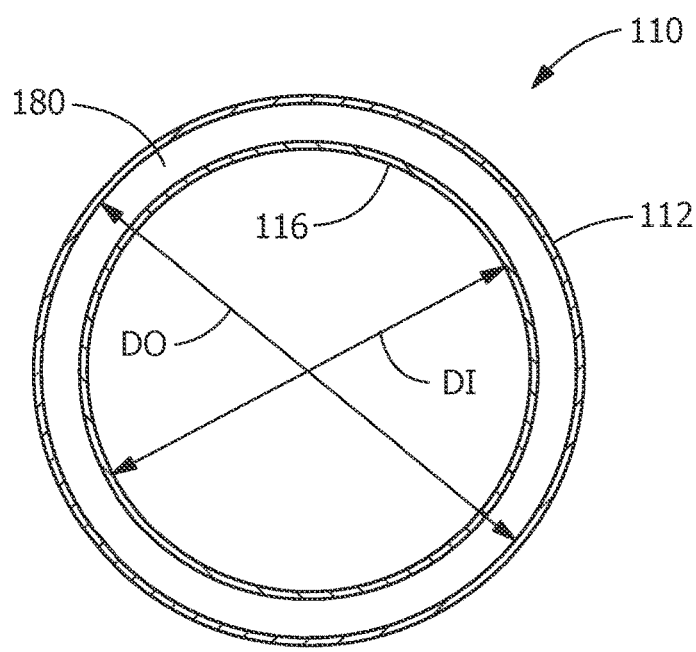
FIG. 12 is a cross-sectional view taken along line 12-12 of FIG. 9.
Figure 13:
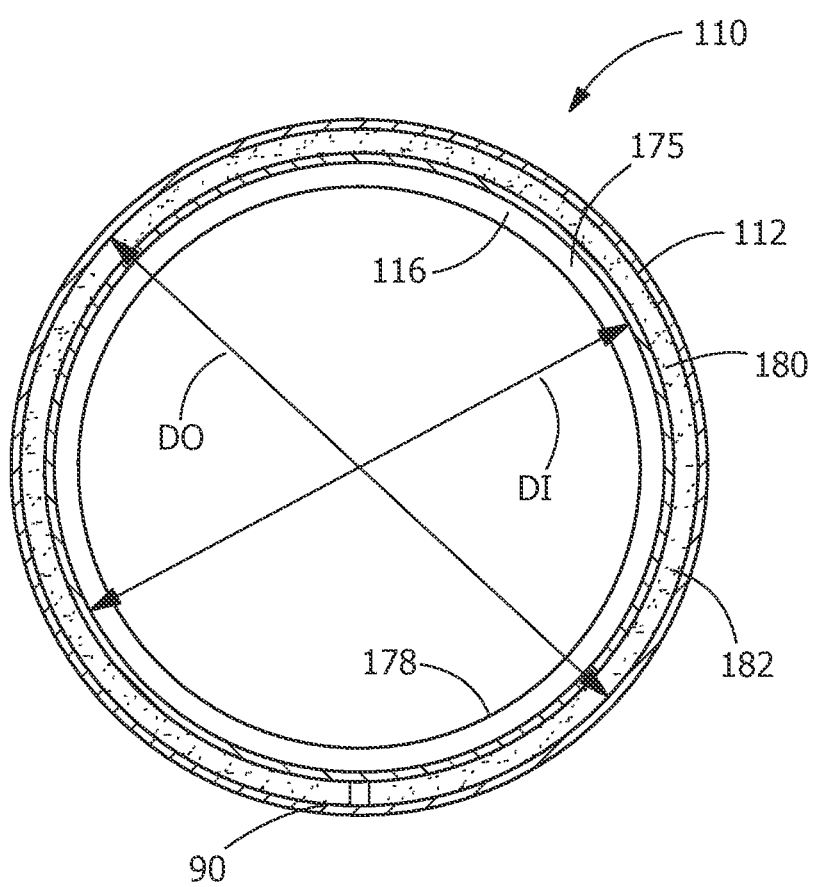
FIG. 13 is a cross-sectional view taken along line 13-13 of FIG. 9, with a hazard control material provided between the inner shell and the outer shell.
Figure 14:
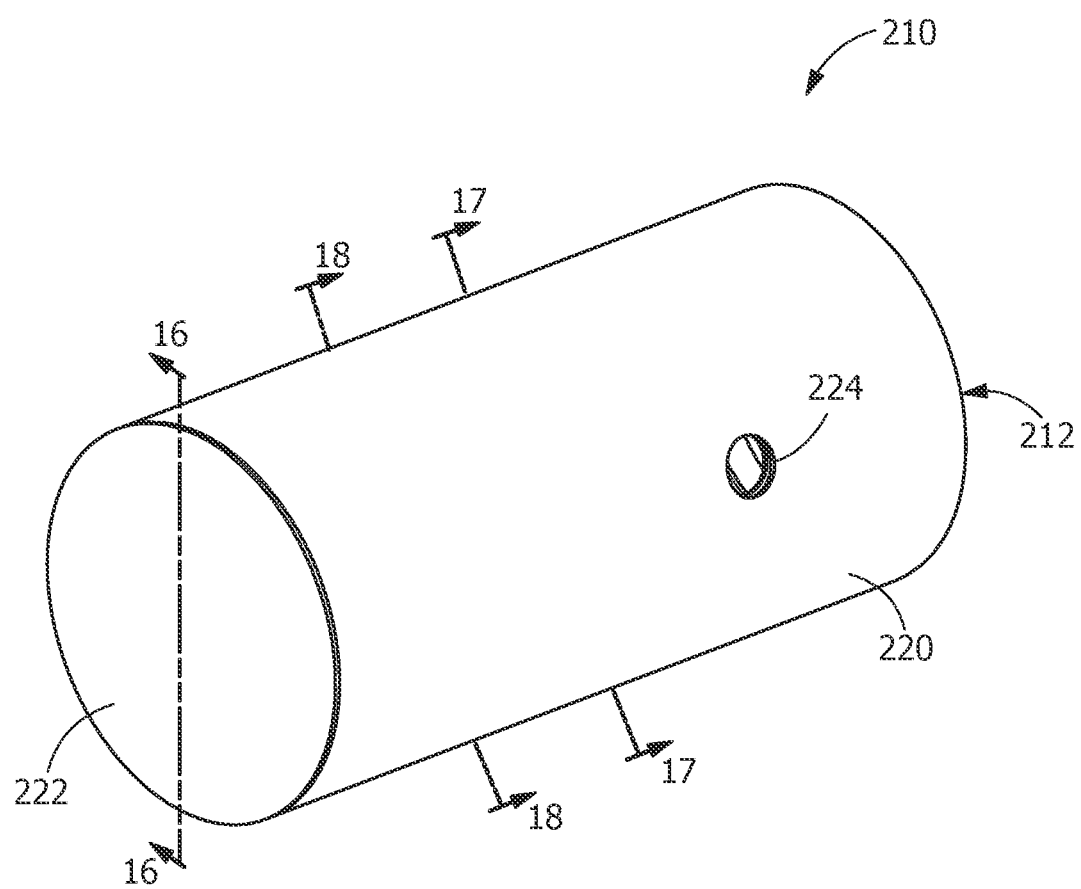
FIG. 14 is a perspective view of a third illustrative container, compartment or tank according to the present invention.

The side wall 160 and end walls 162 of the inner shell 116 form an inner tank which is configured to hold the fuel or energy source during normal operation of the vehicle. As shown in FIG. 12, the side wall 160 of the inner shell 116 has an outer diameter DO which is smaller than the inner diameter DI of the side wall 120 of the outer shell 112. Consequently, a space 180 is provided between the side wall 160 of the inner shell 116 and the side wall 120 of the outer shell 112. As shown in FIG. 11, the length of the inner shell 116, as measured between the end caps 162 proximate to the side wall 160, is less than the length of the outer shell 112, as measured between the end caps 122. Consequently, a space 181 is provided between each end wall 162 of the inner shell 116 and the end wall 122 of the outer shell 112.

The inner shell 116 may include baffles (not shown) or one or more sub compartments, which may be interconnected or isolated from each other. When fully assembled, the inner shell 116 is maintained in position, for example, but not limited to, centered, relative to the outer shell 112 and is held in place by the cooperation of the projections, ridges or peaks 176 of bellow regions 174 with the outer shell 112, as will be more fully described.

The inner shell 116 has one or more cylindrical bellow regions 174 which extend circumferentially around portions of the side wall 160. In the illustrative embodiment shown, the bellow regions 174 are spaced periodically along the length of the inner shell 116, with a respective bellow region 174 positioned proximate each end wall 162. However, the bellow regions 174 may be spaced or positioned in other areas without departing from the scope of the invention.

Each bellow region 174 has one or more ribs 175 with projections, peaks or ridges 176 and valleys 178. The ridges 176 and valleys 178 act as hinge lines to allow the ribs 175 and bellow region 174 to contract, collapse or fold upon the application of a force, to allow the bellow regions 174 to act as a deformable crush zone, as will be more fully described. In the embodiment shown, the ribs 175 have rounded projections, peaks or ridges 176 and rounded valleys 178. However, other configurations of the projections, peaks or ridges 176 and valleys 178 may be provided.

In the illustrative embodiment shown, the projections, peaks or ridges 176 have a larger diameter than the side wall 160, thereby allowing the ridges 176 to project beyond the side wall 160. This allows the ridges 176 to engage the side wall 120 of the outer shell 112, thereby maintaining the positioning of the inner shell 116 in the outer shell 112 when in the operating position as the vehicle is operating under normal conditions. In the embodiment shown, the inner shell 116 is centered in the outer shell 112 by the ridges 176. The valleys 178 have a smaller diameter than the side wall 160. However, other configurations of the ridges 176 and valleys 178 may be used.

In various embodiments, inner shell 116 (including the side wall 160 and the end caps 162) and/or outer shell 112 (including the side wall 120 and the end caps 122) may have a coating or layer provided thereon to allow the inner shell 116 to engage or contact the outer shell 112 during normal use without exposing the inner shell 116 and/or outer shell 112 to excessive wear or degradation. Such coating may include, but is not limited to, polymer, metallic, ceramic or other substances. Alternatively, the inner shell 116 (including the side wall 160 and the end caps 162) and the outer shell 112 (including the side wall 120 and the end caps 122) may be bonded by welding, adhesive or other means to prevent movement and wear during normal use.

An inlet pipe or tube is secured to the fuel tank 110 and extends through fuel receiving openings 124, 164. The inlet tube may be secured to the fuel tank 110 in any known manner. The inlet tube is for the purpose of introducing the desired fuel into the inner shell 116 of the tank 110. The inlet tube may be secured to the fuel tank 110 at various locations, including, but not limited to, near the rearward end of the tank 110. A fuel feed tube or pipe extends through the fuel dispensing openings of the fuel tank 110 for the purpose of feeding the fuel to the engine of the vehicle. The feed tube or pipe may be located at various locations, including, but not limited to, near the forward end of the tank 110.

In the illustrative embodiment shown, the tank 110 is adapted to be horizontally attached to the truck or vehicle so that the plane of the longitudinal axis of the tank 110 is essentially parallel to the plane of the longitudinal axis of the truck or vehicle. It should be understood that the location and orientation of tank 110 may vary based on various factors, including, but not limited to, the space available for the tank 110 and the desired capacity of the tank 110.

When the vehicle or truck is operating under normal conditions (no impact caused by a collision, crash or accident has occurred), the inner shell 116 is maintained in position by the engagement of the ridges 176 of the ribs 175 of the bellow regions 174 with the outer shell 112. The diameter of the ridges 176 is approximate to or slightly greater than the inside diameter DI of the outer shell 112, thereby allowing the ridges 176 to be placed in frictional or compression engagement with the outer shell 112. This provides a sufficient force to maintain the inner shell 116 in position relative to the outer shell 112 when the vehicle and fuel tank 110 are operating under normal conditions. As previously described, in the illustrative embodiment shown, the inner tank 116 is centered in the outer shell 112. In this position, the side wall 160 of the inner shell 116 and the side wall 120 of the outer shell 112 are separated by space 180. In addition, portions of the end walls 162 of the inner shell 116 proximate the side wall 160, and the end walls 122 of the outer shell 112 proximate side wall 120 are separated by space 181. However, during an impact, such as caused by a collision, crash or accident, the force of the impact may be sufficient to overcome the force between the ridges 176 and the outer shell 112 and may cause the inner shell 116 to move relative to the outer shell 112.

The outer shell 112 of the fuel tank 110 is mounted to the vehicle using known methods, such as, but not limited to, bolts, welding and straps. The positioning of the fuel tank on the vehicle may vary depending on the configuration of the vehicle. Such locations include, but are not limited to, on the side of the vehicle, under the vehicle or on top of the vehicle, or between the frame rails of the vehicle. In various applications, the outer shell 112 may be mounted in such a manner to allow for the release of the outer shell 112 when a force is applied or transmitted to the fuel tank 110 due to an impact. This allows the fuel tank 110 to be moved axially and/or radially relative to the chassis to a position in which the fuel tank 110 is moved further from the point of impact, out of the path of the impact or protected by the chassis of the vehicle.

While the inner shell 116 is captured by outer shell 112 and inhibited or prevented from movement relative to the vehicle during normal operation, the inner shell 116 may move independent of the vehicle and/or the outer shell 112 during an impact or event.

During an impact, if the force of the impact transferred to the fuel tank 110 is larger than the force holding the inner shell 116 in position relative to the outer shell 112, the inner shell 116 will move relative to the outer shell 112. This movement is facilitated by the spaces 180, 181 provided between the outer shell 112 and the inner shell 116. This allows a portion of the energy or the forces associated with an impact to be absorbed by the outer shell 112, thereby reducing the energy or force transferred to the inner shell 116.

The inner shell 116 is movable relative to the vehicle and the outer shell 112 during the impact, thereby allowing the inner shell 116 to move inside the outer shell 112. This allows the inner shell 116 of the fuel tank 110 to be moved axially and/or radially relative to the outer shell 112 of the fuel tank 110. In addition, in various embodiments, the outer shell 112 is movable relative to the vehicle during an impact. This allows the inner shell 116, along with the outer shell 112, of the fuel tank 110 to be moved axially and/or radially relative to the chassis of the vehicle to a position in which the inner shell 116 is moved further from the point of impact, out of the path of the impact or protected by the chassis of the vehicle and/or the outer shell 112. The movement of the inner shell 116 relative to the vehicle and the outer shell 112 may be, but is not limited to, i) in a direction which is horizontal or lateral to the direction of the longitudinal axis of the vehicle, ii) in a direction which is vertical or perpendicular to the direction of the longitudinal axis of the vehicle, iii) in a direction which is in line with the longitudinal axis of the vehicle, iv) rotationally about the x axis, v) rotationally about the y axis, vi) rotationally about the z axis, or vii) in a direction which is a combination of any or all of i), ii), iii), iv), v and/or vi). This allows the inner shell 116 to have 6 degrees of freedom via the movement and distortion of the outer shell 112.

As previously described, the outer shell 112 absorbs a percentage of the energy or forces associated with the impact or event. The outer shell 112 also provides additional resistance to punctures or tears, as the outer shell 112 is made from material having sufficient strength to resist or inhibit the puncture or tearing thereof. As the outer shell 112 forms a continuous shield around the inner shell 116, the inner shell 116 is protected. In addition, as the inner shell 116 is movable or displaced relative to the outer shell 112 away from the point of impact during an impact, the inner shell 116 is allowed to be moved away from any object or protrusion which extends through the outer shell 112 at or near the point of impact, thereby preventing or inhibiting sharp objects or protrusions from contacting the inner shell 116. Instead, the protrusions engage the outer shell 112. As the inner shell 116 is protected by the outer shell 112, the risk of failure of the inner shell 116 is reduced.

The fuel tank 110 described herein absorbs and manages the energy created by an impact or event to manipulate or move the inner shell 116 to a position in which the inner shell 116 is less prone to failure during or after the impact or event, thereby improving crashworthiness and reducing the occurrence of tank failure, fuel spillage, fire and/or explosion.

If impact forces are transferred to the inner shell 116, the deformable crush zone or bellow regions 174 of the inner shell 116 are designed to contract, collapse or fold in a predictable and controlled manner, thereby absorbing energy and preventing the failure or puncture of the inner tank 116. This designed or controlled collapse of the deformable crush zone or the bellow regions 174 protects other areas of the inner tanks 116 from failure. The configuration, thickness and spacing of the ribs 175 of the bellow regions 174 can be altered to accommodate different forces associated with impact. As the bellow regions 174 are configured to absorb energy associated with the impact, the bellow regions 174 may be strengthened to inhibit or prevent failure of the bellow regions 174 and the inner tank 116.

In addition, if impact forces are transferred to the inner shell 116, the radiused end walls 162 of the inner shell 116 are designed to contract, collapse or fold in a predictable and controlled manner, thereby absorbing energy and preventing the failure or puncture of the inner tank 116. This designed or controlled collapse of the radiused end walls 162 protects other areas of the inner tanks 116 from failure. The configuration or curvature of the radiused end walls 162 can be altered to accommodate different forces associated with impact.

A spring loaded check valve 90 (FIG. 8) may be provided in the inner shell 116. The spring loaded check valve 90 operates in a known manner to maintain the fuel in the inner shell 116 during normal operating conditions. In the event of an impact, the spring loaded check valve 90 is configured to open and release the fuel if a threshold pressure inside the inner shell 116 is exceeded, for example, but not limited to, when the bellows regions 174 collapse. This facilitates the controlled release of the fuel during an impact.

In alternate illustrative embodiments, the outer shell 112 and/or inner shell 116 may also have energy dissipating/absorbing material, such as, but not limited to, aluminum, polymer or ferrous material attached thereto. The energy dissipating/absorbing material provides additional protection to the fuel tanks, as the energy dissipating/absorbing material further isolates the forces associated with the impact or event from reaching or damaging the inner shell 116.

In alternate illustrative embodiments, the space 180 and/or the space 181 between the inner shell 116 and the outer shell 112 may also include a hazard control material 182. The fuel tank 110 may be configured to release the hazard control material 182 in response to a hazard condition (for example, an impact) such that the fuel is less hazardous or rendered substantially harmless. The hazard control material 182 may include a fire extinguishant or fire suppressant material. As a result of an impact, which causes the inner shell 116 to fail, the hazard control material 182 interacts with the fuel to control, suppress or extinguish any combustion associated with the release of the fuel and vapors from the inner shell 116. In this way, the probability of creating a fireball in the fuel tank is reduced and the risks associated with operation of the vehicle are decreased.

The space 180 and/or the space 181 may be configured to accommodate sufficient hazard control material 182 according to the anticipated hazard. The space 180 and/or the space 181 may include one or more separate sub compartments or interconnected semi-separate sub compartments. In addition, the space 180 and/or the space 181 may comprise any appropriate materials to accommodate the hazard control material 182. For example, the inner shell 116 and outer shell 112 may comprise or be lined with materials that do not react to the hazard control material 182 or provide a shield around the hazard control material 182. The inner shell 116 and/or outer shell 112 may be configured to fail or open in a specific location, such as at the check valve 90, upon impact to facilitate the controlled release of the fuel and the hazard control material 182 into the surrounding environment, thereby minimizing or preventing the release of atomized fuel. Consequently, the hazard control material 182 may be positioned proximate to the specific location or the spring loaded check valve 90 for maximum efficiency.

The hazard control material 182 may include a substantially solid material such as granular material or a powder, as well as a substantially fluid material such as liquids, gases and vapors. The hazard control material 182 may comprise a material in various phases simultaneously. In addition, the hazard control material 182 may include multiple materials.

In use, during an impact, the inner shell 116 may rupture or fail, causing the fuel or energy source to be released from the inner shell 116, generating the hazard condition. However, the fuel contacts, mixes and reacts with the hazard control material 182, allowing the hazard control material 182 to mitigate the hazard presented by the fuel following the trigger event.

The outer shell 112 forms a protective area, cage or support area which provides a crush zone to protect the inner shell 116 by absorbing and dissipating the energy associated with an impact. The use of the outer shell 112 provides both impact and tearing protection for the inner shell 116. The outer shell 112 also allows mounting of additional energy absorbing devices or structures as needed.

Referring to FIGS. 14 through 18, an alternate compartment for storing fuel or container for storing fuel exemplified as an alternate fuel tank 210 is shown for a motor vehicle 11 (FIGS. 6*a* and 6*b*), such as, but not limited to, a car, bus, tractor of a tractor trailer truck, other heavy trucks, boats, airplanes or other types of vehicles. While one fuel tank 210 is shown, other numbers of fuel tanks may be used without departing from the scope of the invention. Fuel is any component or substance which is an energy source for a motor vehicle, including, but not limited to, compressed natural gas, liquefied natural gas, liquefied petroleum gas, hydrogen, diesel, biodiesel, methane, methanol, biobutanol, dimethyl ether, ammonia, renewable hydrocarbon biofuels, batteries, and fuel cells.

The fuel tank 210 includes a first or protective outer casing, shell or tank 212, a crush sleeve 214 and a second or inner casing, shell or tank 216 which is configured to hold the fuel or energy source. While the protective outer shell 212, the crush sleeve 214 and the inner shell 216 are shown as cylindrical members in the illustrative embodiment, other shapes and configurations may be used without departing from the scope of the invention. While the illustrative embodiment shows and describes the crush sleeve 214, the crush sleeve 214 may be omitted without departing from the scope of the invention.

The protective outer shell 212 has a cylindrical side wall 220 and end walls or caps 222. One or both end walls 222 are attached to the side wall 220 after the crush sleeve 214 and inner shell 216 have been inserted therein. In the illustrative embodiment shown, a fuel receiving opening 224 and a fuel dispensing opening (not shown) extends through the side wall 220. The side wall 220 may be made in one continuous piece with no seam or may be made by forming sheet material into a cylindrical member and joining the ends in any conventional manner, such as by a series of continuous welds. The end walls 222 are joined to the side wall 220 in any conventional manner, such as by a series of continuous welds. The side wall 220 and end walls 222 may be made from any material having the strength characteristics desired, including, but not limited to, aluminum, steel and cross-linked polyethylene. The side wall 220 and end walls 222 of the protective outer shell 212 form an outer tank.

In the illustrative embodiment shown, the crush sleeve 214 has a cylindrical side wall 230 and end caps 232. However, the crush sleeve 214 can be of various configurations without departing from the scope of the invention. For example, spokes, fins or honeycombs may be provided to properly position and maintain the inner shell 216 in the outer shell 212.

In the illustrative embodiment shown, a fuel receiving opening 234 and a fuel dispensing opening (not shown) extends through the side wall 230. The side wall 230 may be made in one continuous piece with no seam or may be made by forming sheet material into a cylindrical member and joining the ends of the sheet in any conventional manner, such as by a series of continuous welds. The side wall 230 may be made from any material having the strength characteristics desired, including, but not limited to, steel, cross-linked polyethylene and carbon fiber reinforced composite.

In the illustrative embodiment shown, the crush sleeve 214 has a corrugated surface 236 which extends essentially the entire length of the crush sleeve 214. The end caps 232 also have corrugated surfaces. The corrugated surface 236 include a plurality of elongate ridge structures or corrugations 238 formed in the material of the crush sleeve 214. Corrugated surface 236 advantageously change the strength and rigidity of the crush sleeve 214. The change in strength or rigidity may be increased or decreased depending upon the structure of the corrugated surface 236. Furthermore, corrugated surface 36 provides spacing between the outer shell 212 and the inner shell 216, as will be more fully described. The plurality of corrugations 238 are similar to corrugations 38 previously described.

The nonlinear configuration of the crush sleeve 214 provides additional strengthening thereby enhancing the ability of the crush sleeve 214 to provide additional integrity to the fuel tank 210 and to provide additional crush resistance for the inner shell 216. The nonlinear configuration also allows for forces applied thereto to be better dissipated over the entire surface of the crush sleeve 214, thereby preventing lateral forces from being transferred directly to the inner shell 216 during an impact. During a less severe impact, the energy distributed to the corrugations 238 or the impact energy is dissipated or stored elastically, thus reducing the probability of failure during a less severe impact.

The inner shell 216 may be made of rigid, semi-rigid or elastic material. The inner shell 216 has a cylindrical side wall 260 and end walls or caps 262. In the illustrative embodiment shown, the end walls 262 have a curved, radiused or arcuate configuration wherein the center of the end walls 262 is positioned proximate to or in engagement with the end walls 222. However, the end walls 262 may have other configurations, such as, but not limited to straight and may include ribbed or bellow regions.

In the illustrative embodiment shown, a fuel receiving opening 264 and a fuel dispensing opening (not shown) extend through the side wall 260. The side wall 260 may be made in one continuous piece with no seam or may be made by forming sheet material into a cylindrical member and joining the ends in any conventional manner, such as by a series of continuous welds. The end walls 262 are joined to the side wall 260 in any conventional manner, such as by a series of continuous welds. The side wall 260 and end walls 262 are rigid, semi-rigid or elastic and may be made from any material having the strength characteristics desired and which will not degrade or fail when exposed to the fuel or energy source which is stored in the inner shell 216, such as, but not limited to, steel, aluminum, polyethylene or neoprene.

Figure 16:
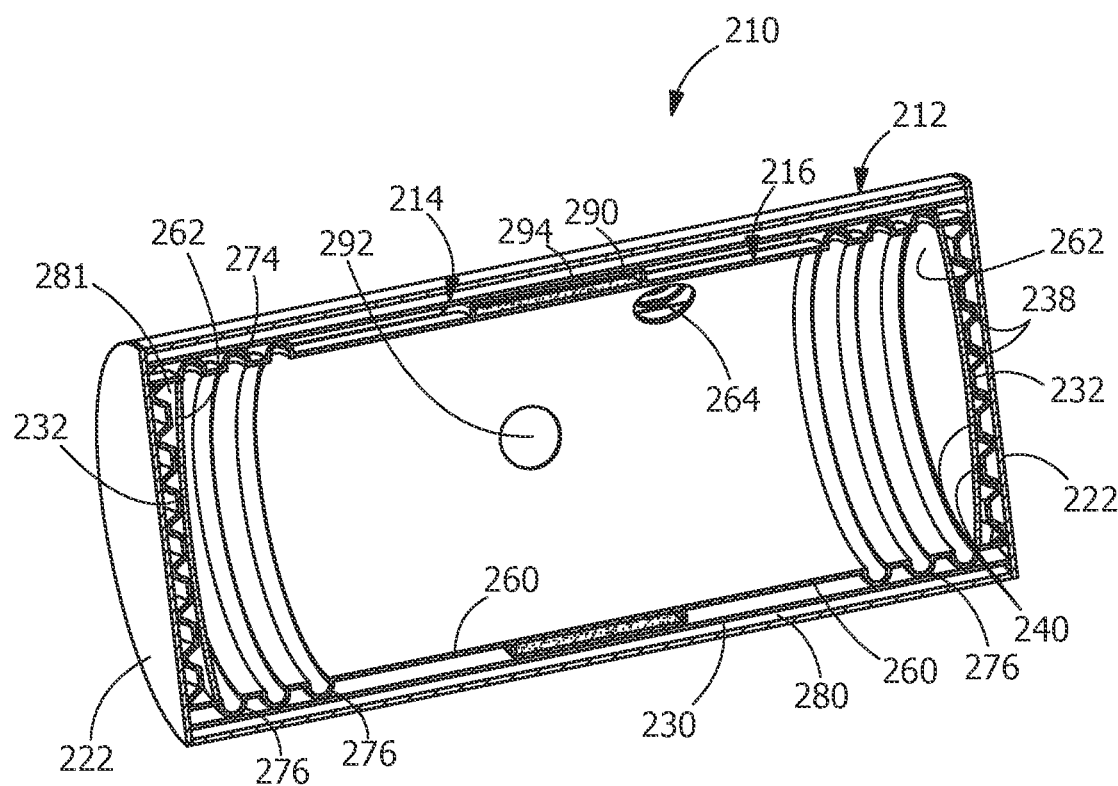
FIG. 16 is a cross-sectional view taken along line 16-16 of FIG. 14.
Figure 17:
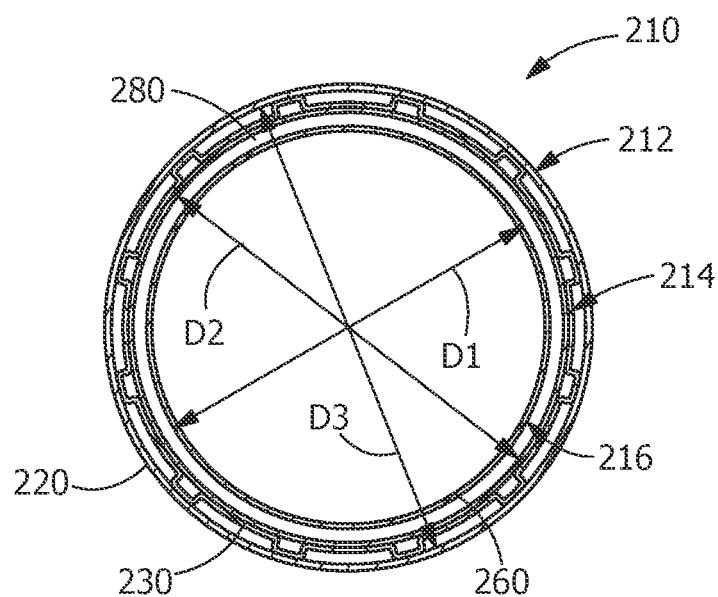
FIG. 17 is a cross-sectional view taken along line 17-17 of FIG. 14.
Figure 18:
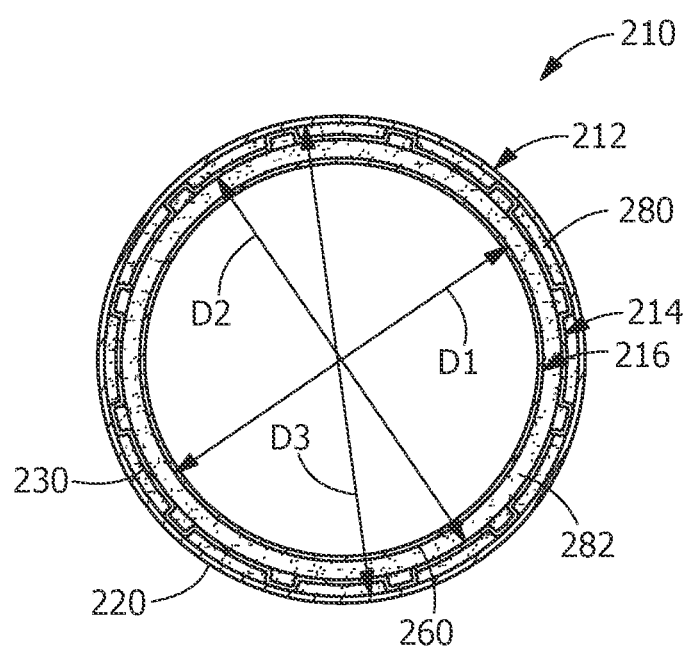
FIG. 18 is a cross-sectional view taken along line 18-18 of FIG. 14, with a hazard control material provided between the inner shell and the outer shell.

The side wall 260 and end walls 262 of the inner shell 216 form an inner tank which is configured to hold the fuel or energy source during normal operation of the vehicle. As shown in FIG. 17, the side wall 260 of the inner shell 216 has a diameter D1 which is smaller than the diameter D2 of the side wall 230 of the crush sleeve 214 and the diameter D3 of the side wall 220 of the outer shell 212. Consequently, a space 280 is provided between the side wall 260 of the inner shell 216 and the side wall 220 of the outer shell 212. As shown in FIG. 16, the length of the inner shell 216, as measured between the end caps 262 proximate to the side wall 260, is less than the length of the crush sleeve 214, as measured between the end caps 232. Consequently, a space 281 is provided between each end wall 262 of the inner shell 216 and the end wall 232 of the crush sleeve 214.

When fully assembled, the inner shell 216 is maintained in position, for example, but not limited to, centered, relative to the outer shell 212 and the crush sleeve 214 and is held in place by the cooperation of the projections, ridges or peaks 276 of bellow regions 274 and sealed jacket 290 with the crush sleeve 214 and the cooperation of the corrugated surface 236 of the crush sleeve 214 with the outer shell 212, as will be more fully described.

The inner shell 216 has one or more cylindrical bellow regions 274 which extend circumferentially around portions of the side wall 260. In the illustrative embodiment shown, the bellow regions 274 are positioned proximate either end wall 162 of the inner shell 216. However, the bellow regions 274 may be spaced or positioned in other areas without departing from the scope of the invention.

Each bellow region 274 has one or more ribs 275 with projections, peaks or ridges 276 and valleys 278. The ridges 276 and valleys 278 act as hinge lines to allow the ribs 275 and bellow region 274 to contract, collapse or fold upon the application of a force, to allow the bellow regions 274 to act as deformable crush zones, as will be more fully described. In the embodiment shown, the ribs 275 have rounded projections, peaks or ridges 276 and rounded valleys 278. However, other configurations of the projections, peaks or ridges 276 and valleys 278 may be provided.

In the illustrative embodiment shown, the projections, peaks or ridges 276 have a larger diameter than the side wall 260, thereby allowing the ridges 276 to project beyond the side wall 260. This allows the ridges 276 to engage the crush sleeve 214, thereby maintaining the positioning of the inner shell 216 in the crush sleeve 214 and the outer shell 212 when in the operating position as the vehicle is operating under normal conditions. The valleys 278 have a smaller diameter than the side wall 260. However, other configurations of the ridges 276 and valleys 278 may be used.

The inner shell 216 has one or more cylindrical sealed bladders or jackets 290 which extend circumferentially around portions of the side wall 260. In the illustrative embodiment shown, one sealed bladder or jacket 290 is positioned proximate the center of the inner shell 216. However, several sealed bladders or jackets 290 may be spaced or positioned in other areas without departing from the scope of the invention.

In the illustrative embodiment shown, the sealed jacket 290 has a larger diameter than the side wall 260, thereby allowing the sealed jacket 290 to project beyond the side wall 260. This allows the sealed jacket 290 to engage the crush sleeve 214, thereby maintaining the positioning of the inner shell 216 in the crush sleeve 214 when in the operating position as the vehicle is operating under normal conditions.

In the embodiment shown, the inner shell 216 is centered in the crush sleeve 214 the by the ridges 276 and the sealed jacket 290. In addition, end walls 262 of the inner shell 216 cooperate with the end caps 232 of the crush sleeve 214 and the end wall 222 of the outer shell 212 to properly position the inner shell 216 in the crush sleeve 214.

Figure 15:
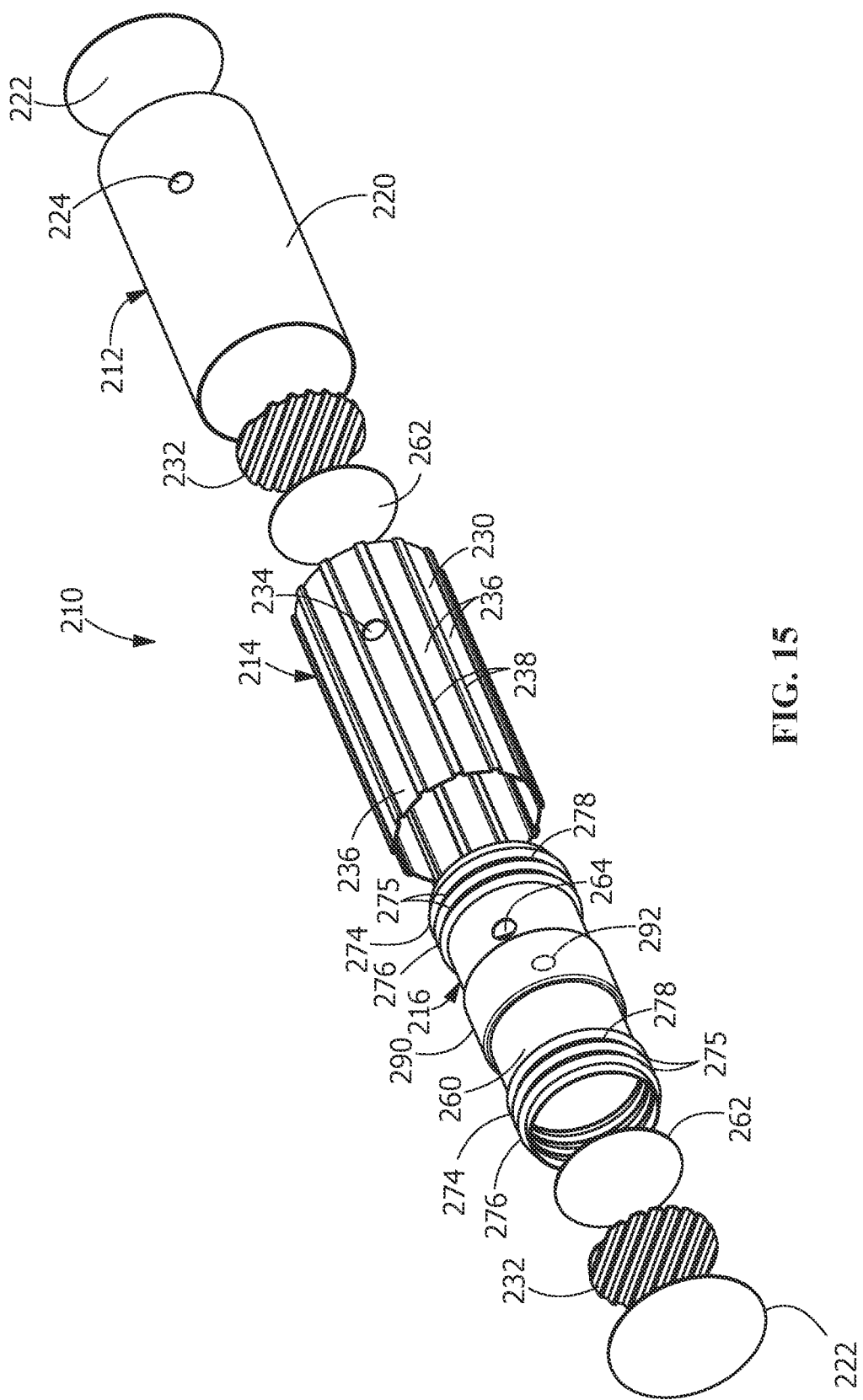
FIG. 15 is an exploded view of the container, compartment or tank of FIG. 14, illustrating an outer shell, an inner shell and a crush sleeve.

The inner shell 216 has a burst disk or check valve 292, as shown in FIG. 15. The valve 292 operates in a known manner to maintain the fuel in the inner shell 216 during normal operating conditions. In the event of an impact, the valve 292 is configured to open and release the fuel if a threshold pressure inside the inner shell 216 is exceeded. This facilitates the controlled release of the fuel during an impact. In the illustrative embodiment shown, the valve 292 is positioned under the sealed jacket 290, whereby the controlled release of the fuel during an impact occurs into the sealed jacket 290. This allows additional volume for the fuel to flow. In addition, as the sealed jacket 290 is sealed to the inner shell 219, the fuel released into the sealed jacket 290 will be retained in the sealed jacket 290, thereby minimizing or preventing the release of atomized fuel into the surrounding environment, thereby reducing the probability of creating a fireball in the fuel tank and reducing the risks associated with operation of the vehicle. A hazard control material 294, similar to that previously described, may also be provided in the sealed jacket.

In various embodiments, the inner shell 216 (including the side wall 260 and the end caps 262), the outer shell 212 (including the side wall 220 and the end caps 222) and the crush sleeve 214 (including the side wall 230 and the end caps 232) may have a coating or layer provided thereon to allow the inner shell 216, the outer shell 212 and the crush sleeve 214 to engage or contact each other during normal use without exposing the inner shell 216, outer shell 212 and or crush sleeve 214 to excessive wear or degradation. Such coating may include, but is not limited to, polymer, metallic, ceramic or other substances. Alternatively, the inner shell 216, outer shell 212 and or crush sleeve 214 may be bonded by welding, adhesive or other means to prevent movement and wear during normal use.

When the vehicle or truck is operating under normal conditions (no impact caused by a collision, crash or accident has occurred), the inner shell 216 is maintained in position by the engagement of the ridges 276 of the ribs 275 of the bellow regions 274 with the crush sleeve 214. The crush sleeve 214 is maintained in position by the engagement of the corrugated surface 236 with the outer shell 212. The diameter of the ridges 276 is approximate to or slightly greater than the inside diameter DI of the crush sleeve 214, thereby allowing the ridges 276 to be placed in frictional or compression engagement with the crush sleeve 214. This provides a sufficient force to maintain the inner shell 216 in position relative to crush sleeve 214 when the vehicle and fuel tank 210 are operating under normal conditions. As previously described, in the illustrative embodiment shown, the inner tank 216 is centered in the crush sleeve 214. In this position, the side wall 260 of the inner shell 216 and the side wall 230 of the crush sleeve 214 are separated by space 280. In addition, portions of the end walls 262 of the inner shell 216 proximate the side wall 260, and the end walls 232 of the crush sleeve 214 proximate side wall 230 are separated by space 281. However, during an impact, such as caused by a collision, crash or accident, the force of the impact may be sufficient to overcome the force between the ridges 276 and the outer shell 212 and may cause the inner shell 216 to move relative to the crush sleeve 214. The movement of the crush sleeve 214 relative to the outer shell 212 is similar to that described with respect to FIGS. 1 through 5.

The outer shell 212 of the fuel tank 210 is mounted to the vehicle using known methods, such as, but not limited to, bolts, welding and straps. The positioning of the fuel tank on the vehicle may vary depending on the configuration of the vehicle. Such locations include, but are not limited to, on the side of the vehicle, under the vehicle or on top of the vehicle, or between the frame rails of the vehicle. In various applications, the outer shell 212 may be mounted in such a manner to allow for the release of the outer shell 212 when a force is applied or transmitted to the fuel tank 210 due to an impact. This allows the fuel tank 210 to be moved axially and/or radially relative to the chassis to a position in which the fuel tank 210 is moved further from the point of impact, out of the path of the impact or protected by the chassis of the vehicle.

While the inner shell 216 is captured by the crush sleeve 214 and the outer shell 212 and inhibited or prevented from movement relative to the vehicle during normal operation, the inner shell 216 may move independent of the vehicle, the outer shell 212 and/or the crush sleeve 214 during an impact or event.

During an impact, if the force of the impact transferred to the fuel tank 210 is larger than the force holding the inner shell 216 in position relative to the outer shell 212 and/or the crush sleeve 214, the inner shell 216 will move relative to the outer shell 212 and/or the crush sleeve 214. This movement is facilitated by the spaces 280, 281 provided between the outer shell 212 and the crush sleeve 214. This allows a portion of the energy or the forces associated with an impact to be absorbed by the outer shell 212 and/or the crush sleeve 214, thereby reducing the energy or force transferred to the inner shell 216.

The inner shell 216 is movable relative to the vehicle, the outer shell 212, and/or the crush sleeve 214 during the impact, thereby allowing the inner shell 216 to move inside the outer shell 212 and/or the crush sleeve 214. This allows the inner shell 216 of the fuel tank 210 to be moved axially and/or radially relative to the outer shell 212 and/or the crush sleeve 214 of the fuel tank 210. In addition, in various embodiments, the outer shell 212 is movable relative to the vehicle during an impact. This allows the inner shell 216, along with the outer shell 212 and/or the crush sleeve 214, of the fuel tank 210 to be moved axially and/or radially relative to the chassis of the vehicle to a position in which the inner shell 216 is moved further from the point of impact, out of the path of the impact or protected by the chassis of the vehicle, the outer shell 212 and/or the crush sleeve 214. The movement of the inner shell 216 relative to the vehicle, the outer shell 212 and/or the crush sleeve 214 may be, but is not limited to, i) in a direction which is horizontal or lateral to the direction of the longitudinal axis of the vehicle, ii) in a direction which is vertical or perpendicular to the direction of the longitudinal axis of the vehicle, iii) in a direction which is in line with the longitudinal axis of the vehicle, iv) rotationally about the x axis, v) rotationally about the y axis, vi) rotationally about the z axis, or vii) in a direction which is a combination of any or all of i), ii, iii), iv), v and/or vi). This allows the inner shell 216 to have 6 degrees of freedom via the movement and distortion of the outer shell 212 and/or the crush sleeve 214.

As previously described, the outer shell 212 and/or the crush sleeve 214 absorbs a percentage of the energy or forces associated with the impact or event. The outer shell 212 and/or the crush sleeve 214 also provides additional resistance to punctures or tears, as the outer shell 212 and the crush sleeve 214 are made from material having sufficient strength to resist or inhibit the puncture or tearing thereof. As the outer shell 212 and the crush sleeve 214 form a continuous shield around the inner shell 216, the inner shell 216 is protected. In addition, as the inner shell 216 is movable or displaced relative to the outer shell 212 and/or the crush sleeve 214 away from the point of impact during an impact, the inner shell 216 is allowed to be moved away from any object or protrusion which extends through the outer shell 212 and the crush sleeve 214 at or near the point of impact, thereby preventing or inhibiting sharp objects or protrusions from contacting the inner shell 216. Instead, the protrusions engage the outer shell 212 and/or the crush sleeve 214. As the inner shell 216 is protected by the outer shell 212 and the crush sleeve 214, the risk of failure of the inner shell 216 is reduced.

The fuel tank 210 described herein absorbs and manages the energy created by an impact or event to manipulate or move the inner shell 216 to a position in which the inner shell 216 is less prone to failure during or after the impact or event, thereby improving crashworthiness and reducing the occurrence of tank failure, fuel spillage, fire and/or explosion.

If impact forces are transferred to the inner shell 216, the deformable crush zone or bellow regions 274 of the inner shell 216 are designed to contract, collapse or fold in a predictable and controlled manner, thereby absorbing energy and preventing the failure or puncture of the inner tank 216. This designed or controlled collapse of the deformable crush zone or the bellow regions 274 protects other areas of the inner tanks 216 from failure. The configuration, thickness and spacing of the ribs 275 of the bellow regions 274 can be altered to accommodate different forces associated with impact. As the bellow regions 274 are configured to absorb energy associated with the impact, the bellow regions 274 may be strengthened to inhibit or prevent failure of the bellow regions 274 and the inner tank 216.

In addition, if impact forces are transferred to the inner shell 216, the radiused end walls 262 of the inner shell 216 are designed to contract, collapse or fold in a predictable and controlled manner, thereby absorbing energy and preventing the failure or puncture of the inner tank 216. This designed or controlled collapse of the radiused end walls 262 protects other areas of the inner tanks 216 from failure. The configuration or curvature of the radiused end walls 262 can be altered to accommodate different forces associated with impact.

The inner shell 216 may have a burst disk or check valve 292, as shown in FIG. 15. The valve 292 operates in a known manner to maintain the fuel in the inner shell 216 during normal operating conditions. In the event of an impact, the valve 292 is configured to open and release the fuel if a threshold pressure inside the inner shell 216 is exceeded. This facilitates the controlled release of the fuel during an impact. In the illustrative embodiment shown, the valve 292 is positioned under the sealed jacket 290, whereby the controlled release of the fuel during an impact occurs into the sealed jacket 290. This allows additional volume for the fuel to flow. In addition, as the sealed jacket 290 is sealed to the inner shell 219, the fuel released into the sealed jacket 290 will be retained in the sealed jacket 290, thereby minimizing or preventing the release of atomized fuel into the surrounding environment, thereby reducing the probability of creating a fireball in the fuel tank and reducing the risks associated with operation of the vehicle.

The burst disk or check valve 292 may be provided in the inner shell 216 and operates in a known manner to maintain the fuel in the inner shell 216 during normal operating conditions. In the event of an impact, the valve 292 is configured to open and release the fuel if a threshold pressure inside the inner shell 216 is exceeded, for example, but not limited to, when the bellows regions 274 collapse. This facilitates the controlled release of the fuel during an impact.

In alternate illustrative embodiments, the outer shell 212 and/or inner shell 216 may also have energy dissipating/absorbing material, such as, but not limited to, aluminum, polymer or ferrous material attached thereto. The energy dissipating/absorbing material provides additional protection to the fuel tanks, as the energy dissipating/absorbing material further isolates the forces associated with the impact or event from reaching or damaging the inner shell 216.

In alternate illustrative embodiments, the space 280 and/or the space 281 between the inner shell 216 and the crush sleeve 214 and between the crush sleeve 214 and the other shell 212 may also include a hazard control material 282. The hazard control material 282 an operation are similar to that previously described.

The invention, as shown and described with respect to the illustrative embodiment, provides a fuel tank to improve crashworthiness of the vehicle by reducing the occurrence of tank failure, fuel spillage, fire and/or explosion during and after a collision or similar event, while still providing a sufficient range for the vehicle. The fuel tank allows the energy associated with an event to be managed, such as by allowing the inner shell to be pushed or moved axially and/or radially by the energy of the impact of a collision or similar event to a position in which the inner shell is moved further from the point of impact, out of the path of the impact or protected by the chassis of the vehicle.

In various embodiments, the outer shell may be an existing cylindrical saddle fuel tank. In such embodiments, the inner shell and the crush sleeve are dimensioned to be received in the outer shell and operate in the manner described above.

While the invention has been described with reference to a preferred embodiment, it will be understood by those skilled in the art that various changes may be made and equivalents may be substituted for elements thereof without departing from the spirit and scope of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A compartment for storing an energy source in a vehicle, the compartment comprising:
   a first structure removably maintained in position relative to the vehicle during normal operation of the vehicle;
   a second structure which holds the energy source, the second structure positioned proximate the first structure, the second structure maintained in position relative to the first structure and relative to the vehicle during normal operation of the vehicle;
   wherein during an impact to the vehicle, the first structure is released from the vehicle when a force is transmitted to the first structure during the impact, the first structure is configured to move i) in a direction which is horizontal or lateral to the direction of a longitudinal axis of the vehicle, ii) in a direction which is vertical or perpendicular to the direction of the longitudinal axis of the vehicle, iii) in a direction which is in line with the longitudinal axis of the vehicle, iv) rotationally about a horizontal axis, v) rotationally about a first vertical axis, vi) rotationally about a second vertical axis, or vii) in a direction which is a combination of any or all of i), ii, iii), iv), v) and/or vi);
   wherein during the impact to the vehicle, the second structure is configured to move independent of the first structure i) in a direction which is horizontal or lateral to the direction of a longitudinal axis of the vehicle, ii) in a direction which is vertical or perpendicular to the direction of the longitudinal axis of the vehicle, iii) in a direction which is in line with the longitudinal axis of the vehicle, iv) rotationally about a horizontal axis, v) rotationally about a first vertical axis, vi) rotationally about a second vertical axis, or vii) in a direction which is a combination of any or all of i), ii, iii), iv), v) and/or vi);
   wherein the second structure and/or the first structure has a coating provided thereon to allow the second structure to engage the first structure without causing excessive wear to the second structure or the first structure.

2. The compartment for storing the energy source in the vehicle as recited in claim 1, wherein a portion of energy or forces associated with the impact is absorbed by the first structure, reducing the energy or force transferred to the second structure.

3. The compartment for storing the energy source in the vehicle as recited in claim 1, wherein the second structure is a fuel tank.

4. A compartment for storing an energy source in a vehicle, the compartment comprising:
   a first structure removably maintained in position relative to the vehicle during normal operation of the vehicle;
   a second structure which holds the energy source, the second structure positioned proximate the first structure, the second structure maintained in position relative to the first structure and relative to the vehicle during normal operation of the vehicle;
   wherein during an impact to the vehicle, the first structure is released from the vehicle when a force is transmitted to the first structure during the impact, the first structure is configured to move i) in a direction which is horizontal or lateral to the direction of a longitudinal axis of the vehicle, ii) in a direction which is vertical or perpendicular to the direction of the longitudinal axis of the vehicle, iii) in a direction which is in line with the longitudinal axis of the vehicle, iv) rotationally about a horizontal axis, v) rotationally about a first vertical axis, vi) rotationally about a second vertical axis, or vii) in a direction which is a combination of any or all of i), ii, iii), iv), v) and/or vi);
   wherein during the impact to the vehicle, the second structure is configured to move independent of the first structure i) in a direction which is horizontal or lateral to the direction of a longitudinal axis of the vehicle, ii) in a direction which is vertical or perpendicular to the direction of the longitudinal axis of the vehicle, iii) in a direction which is in line with the longitudinal axis of the vehicle, iv) rotationally about a horizontal axis, v) rotationally about a first vertical axis, vi) rotationally about a second vertical axis, or vii) in a direction which is a combination of any or all of i), ii, iii), iv), v) and/or vi);
   wherein a hazard control material is provided between the first structure and the second structure.

5. A compartment for storing an energy source in a vehicle, the compartment comprising:
   a first structure removably maintained in position relative to the vehicle during normal operation of the vehicle;
   a second structure which holds the energy source, the second structure positioned proximate the first structure, the second structure maintained in position relative to the first structure and relative to the vehicle during normal operation of the vehicle;
   wherein during an impact to the vehicle, the first structure is released from the vehicle when a force is transmitted to the first structure during the impact, the first structure is configured to move i) in a direction which is horizontal or lateral to the direction of a longitudinal axis of the vehicle, ii) in a direction which is vertical or perpendicular to the direction of the longitudinal axis of the vehicle, iii) in a direction which is in line with the longitudinal axis of the vehicle, iv) rotationally about a horizontal axis, v) rotationally about a first vertical axis, vi) rotationally about a second vertical axis, or vii) in a direction which is a combination of any or all of i), ii, iii), iv), v) and/or vi);
   wherein during the impact to the vehicle, the second structure is configured to move independent of the first structure i) in a direction which is horizontal or lateral to the direction of a longitudinal axis of the vehicle, ii) in a direction which is vertical or perpendicular to the direction of the longitudinal axis of the vehicle, iii) in a direction which is in line with the longitudinal axis of the vehicle, iv) rotationally about a horizontal axis, v) rotationally about a first vertical axis, vi) rotationally about a second vertical axis, or vii) in a direction which is a combination of any or all of i), ii, iii), iv), v) and/or vi);

wherein a deformable structure is provided between the first structure and the second structure.

6. A compartment for storing an energy source in a vehicle, the compartment comprising:
   a first structure removably maintained in position relative to the vehicle during normal operation of the vehicle;
   a second structure which holds the energy source, the second structure positioned proximate the first structure, the second structure maintained in position relative to the first structure and relative to the vehicle during normal operation of the vehicle;
   wherein during an impact to the vehicle, the first structure is released from the vehicle when a force is transmitted to the first structure during the impact, the first structure is configured to move i) in a direction which is horizontal or lateral to the direction of a longitudinal axis of the vehicle, ii) in a direction which is vertical or perpendicular to the direction of the longitudinal axis of the vehicle, iii) in a direction which is in line with the longitudinal axis of the vehicle, iv) rotationally about a horizontal axis, v) rotationally about a first vertical axis, vi) rotationally about a second vertical axis, or vii) in a direction which is a combination of any or all of i), ii, iii), iv), v) and/or vi);
   wherein during the impact to the vehicle, the second structure is configured to move independent of the first structure i) in a direction which is horizontal or lateral to the direction of a longitudinal axis of the vehicle, ii) in a direction which is vertical or perpendicular to the direction of the longitudinal axis of the vehicle, iii) in a direction which is in line with the longitudinal axis of the vehicle, iv) rotationally about a horizontal axis, v) rotationally about a first vertical axis, vi) rotationally about a second vertical axis, or vii) in a direction which is a combination of any or all of i), ii, iii), iv), v) and/or vi);
   wherein at least one deformable zone is provided on the second structure, wherein during the impact to the vehicle, the at least one deformable zone compresses or is deformed.

7. A compartment for storing an energy source in a vehicle, the compartment comprising:
   a first structure removably maintained in position relative to the vehicle during normal operation of the vehicle;
   a second structure which holds the energy source, the second structure positioned proximate the first structure, the second structure maintained in position relative to the first structure and relative to the vehicle during normal operation of the vehicle;
   wherein during an impact to the vehicle, the first structure is released from the vehicle when a force is transmitted to the first structure during the impact, the first structure is configured to move i) in a direction which is horizontal or lateral to the direction of a longitudinal axis of the vehicle, ii) in a direction which is vertical or perpendicular to the direction of the longitudinal axis of the vehicle, iii) in a direction which is in line with the longitudinal axis of the vehicle, iv) rotationally about a horizontal axis, v) rotationally about a first vertical axis, vi) rotationally about a second vertical axis, or vii) in a direction which is a combination of any or all of i), ii, iii), iv), v) and/or vi);
   wherein during the impact to the vehicle, the second structure is configured to move independent of the first structure i) in a direction which is horizontal or lateral to the direction of a longitudinal axis of the vehicle, ii) in a direction which is vertical or perpendicular to the direction of the longitudinal axis of the vehicle, iii) in a direction which is in line with the longitudinal axis of the vehicle, iv) rotationally about a horizontal axis, v) rotationally about a first vertical axis, vi) rotationally about a second vertical axis, or vii) in a direction which is a combination of any or all of i), ii, iii), iv), v) and/or vi);
   wherein the second structure has a sealed bladder which extends circumferentially around portions of the second structure.

8. The compartment for storing the energy source in the vehicle as recited in claim 7, wherein the second structure has a valve, whereby the controlled release of the energy source into the sealed bladder during the impact occurs.

* * * * *